United States Patent [19]
Kallioniemi et al.

[11] Patent Number: 6,134,316
[45] Date of Patent: *Oct. 17, 2000

[54] TELECOMMUNICATIONS NETWORK WITH RELOCATEABILITY OF SUBSCRIBER NUMBER

[75] Inventors: Karl-Erik Kallioniemi, Skoghall; Per-Erik Mikael Kilhage, Karlstad; Björn Olsson, Kiässbol; Mikael Larsson, Karlstad, all of Sweden

[73] Assignee: Telefonaktiebolaget LM Ericsson, Stockholm, Sweden

[ * ] Notice: This patent issued on a continued prosecution application filed under 37 CFR 1.53(d), and is subject to the twenty year patent term provisions of 35 U.S.C. 154(a)(2).

[21] Appl. No.: 08/733,930

[22] Filed: Oct. 18, 1996

[51] Int. Cl.[7] .................................. H04M 3/42

[52] U.S. Cl. .................. 379/220; 379/207; 379/211; 379/229

[58] Field of Search ................... 379/201, 207, 379/211, 212, 219, 220, 221, 229, 111, 112, 113, 114, 115, 127, 230

[56] References Cited

U.S. PATENT DOCUMENTS

| | | | |
|---|---|---|---|
| 4,754,479 | 6/1988 | Bicknell et al. | 379/207 |
| 4,757,267 | 7/1988 | Riskin | 379/113 |
| 4,791,665 | 12/1988 | Bogart et al. | 379/207 |
| 4,933,967 | 6/1990 | Lo et al. . | |
| 5,101,400 | 3/1992 | Krantz | 370/251 |
| 5,212,691 | 5/1993 | Hokari | 370/384 |
| 5,237,604 | 8/1993 | Ryan | 379/220 |
| 5,255,315 | 10/1993 | Bushnell | 379/221 |
| 5,270,701 | 12/1993 | Ito et al. | 379/211 |
| 5,333,184 | 7/1994 | Doherty et al. | 379/229 |
| 5,369,684 | 11/1994 | Buhl et al. . | |
| 5,400,390 | 3/1995 | Salin . | |
| 5,467,388 | 11/1995 | Redd, Jr. et al. | 379/211 |

(List continued on next page.)

FOREIGN PATENT DOCUMENTS

| | | |
|---|---|---|
| 0 708 570 A2 | 4/1996 | European Pat. Off. . |
| 0 710 042 A2 | 5/1996 | European Pat. Off. . |

OTHER PUBLICATIONS

Australian Communications Authority, "Report on Technical Options for Mobile Number Portability Implementation in Australia", http://www.austel.gov.au/telecom/number/nbrport/accmnp.htm, Mar. 1998, pp. 1–2 and 26–39.

(List continued on next page.)

*Primary Examiner*—Scott Wolinsky
*Attorney, Agent, or Firm*—Nixon & Vanderhye, P.C.

[57] ABSTRACT

A telecommunications domain (20) having subscriber number relocateablity includes a plurality of physical nodes or exchanges (22) between which calls are connected and a subscriber location server (30) which is connected to and accessed by each of the plurality of exchanges (22) in the domain (20). Each exchange (22) has a unique exchange identifier (ID). Generally, when a call is placed to a subscriber in the relocateability domain, a first exchange the call encounters in the domain queries the subscriber location server. When queried, the subscriber location server (30) returns a Network Routing Number (NRN) which includes a Network Routing Prefix (NRP). The Network Routing Prefix (NRP) is a node identifier (NI) for the local exchange to which the called party is connected. The exchange (22) to which the NRN is returned prepares a routing message for the call by including the Network Routing Prefix (NRP) in an Address Signal Field (ASF) of a routing message and by setting a number relocateability flag (NRF) in the routing message. Using the NRP of the routing message, the call is routed to the called party exchange (i.e., the terminating exchange). In the called party exchange, the exchange identifier is recognized as its "own" and thereafter the rest of the Address Signal Field (ASF) is analyzed to identify the called subscriber line.

76 Claims, 17 Drawing Sheets

U.S. PATENT DOCUMENTS

| | | | |
|---|---|---|---|
| 5,473,681 | 12/1995 | Partridge, III | 379/221 |
| 5,475,749 | 12/1995 | Akinpelu et al. | 379/221 |
| 5,481,603 | 1/1996 | Gutierrez et al. | 379/221 |
| 5,497,412 | 3/1996 | Lannen et al. | 455/432 |
| 5,504,804 | 4/1996 | Widmark et al. | 455/414 |
| 5,506,894 | 4/1996 | Billings et al. . | |
| 5,509,058 | 4/1996 | Sestak et al. | 379/201 |
| 5,515,427 | 5/1996 | Carlsen et al. | 379/207 |
| 5,533,107 | 7/1996 | Irwin et al. | 379/221 |
| 5,539,817 | 7/1996 | Wilkes . | |
| 5,550,904 | 8/1996 | Andruska et al. | 379/127 |
| 5,550,910 | 8/1996 | DeJager | 379/220 |
| 5,550,912 | 8/1996 | Akinpelu et al. | 379/221 |
| 5,550,915 | 8/1996 | Partridge, III | 379/112 |
| 5,553,129 | 9/1996 | Partridge, III | 379/220 |
| 5,566,235 | 10/1996 | Hetz | 379/221 |
| 5,583,926 | 12/1996 | Venier et al. . | |
| 5,598,464 | 1/1997 | Hess et al. | 379/207 |
| 5,610,977 | 3/1997 | Williams et al. . | |
| 5,625,681 | 4/1997 | Butler, II | 379/207 |
| 5,661,792 | 8/1997 | Akinpelu et al. | 379/220 |
| 5,664,102 | 9/1997 | Faynberg | 379/207 |
| 5,689,555 | 11/1997 | Sonnenberg | 379/219 |
| 5,696,816 | 12/1997 | Sonnenberg | 379/219 |
| 5,699,416 | 12/1997 | Atkins | 379/207 |
| 5,703,939 | 12/1997 | Bushnell | 379/207 |
| 5,724,658 | 3/1998 | Hasan . | |
| 5,732,131 | 3/1998 | Nimmagadda et al. . | |
| 5,748,724 | 5/1998 | Sonnenberg . | |
| 5,757,894 | 5/1998 | Kay et al. . | |
| 5,758,281 | 5/1998 | Emery et al. . | |
| 5,761,620 | 6/1998 | Furuya et al. . | |
| 5,764,745 | 6/1998 | Chan et al. | 379/207 |
| 5,768,358 | 6/1998 | Venier et al. . | |

OTHER PUBLICATIONS

G. Nilsson, "Number Portability: A Networking Perspective", Telecommunications Magazine, http://www.telecoms-mag.com/marketing/articles/jul97/nilsson.html; Jul. 1997, pp. 1–6.

Obana et al, "Applicability of OSI Directory to Universal Personal Telecommunication (UPT)", Electronics & Communications in Japan, Part I—Communications, vol. 75, No. 10, Oct. 1992, New York, pp. 1–14.

Fujioka et al, "Hierarchical and Distributed Information Handling for UPT", IEEE Network, vol. 4, No. 6, Oct. 1990, New York, pp. 50–60.

Lauer, "IN Architectures for Implementing Universal Personal Telecommunications", IEEE Network, vol. 8, No. 2, Mar. 1994–Apr. 1994, New York, pp. 6–16.

Iida et al, "Agent–Based Personal Communication Network", Fujitsu Scientific and Technical Journal, vol. 32, No. 1, Jun. 1996, Fujitsu, JP, pp. 75–80.

Sonnenberg et al., "Siemens Stromberg–Carlson's Contribution to MCI Metro's Local Number Portability Architecture Task Force Team," pp. 1–13 and attachments 1 and 2, Feb. 1995.

Fig. 3
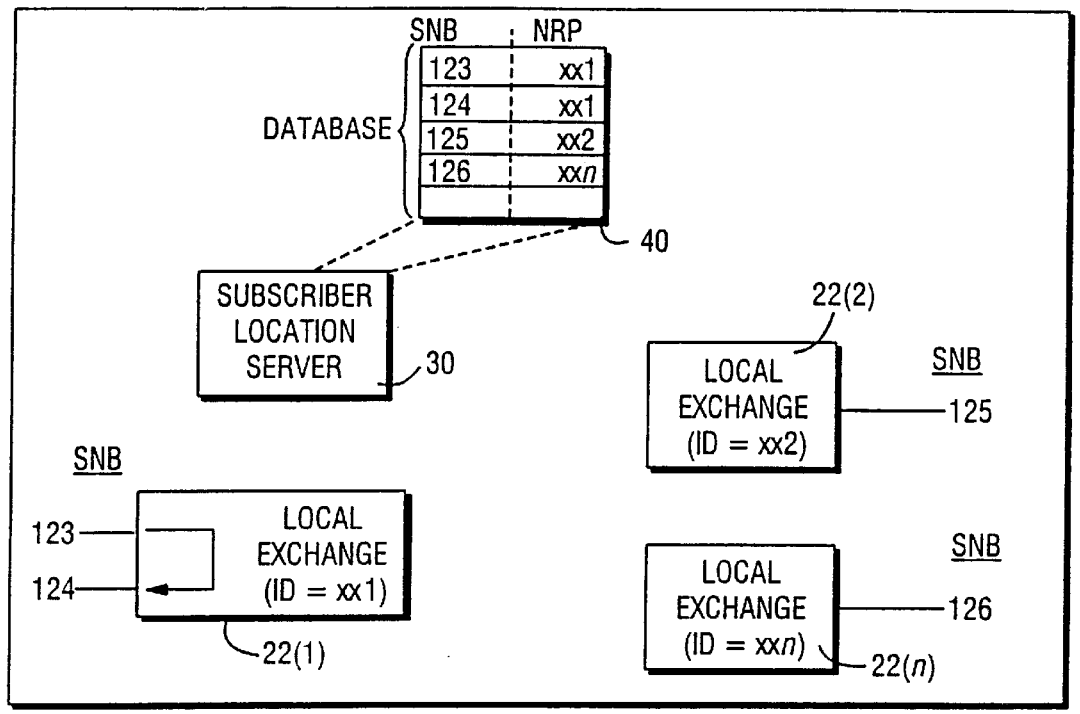
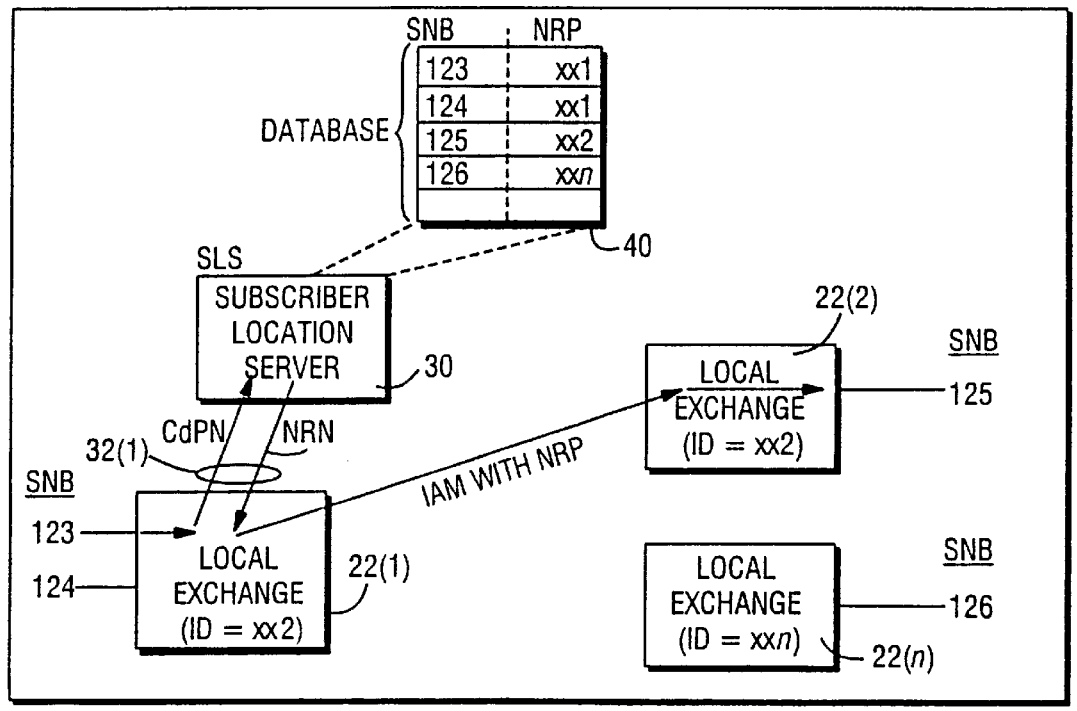
Fig. 4

Fig. 5
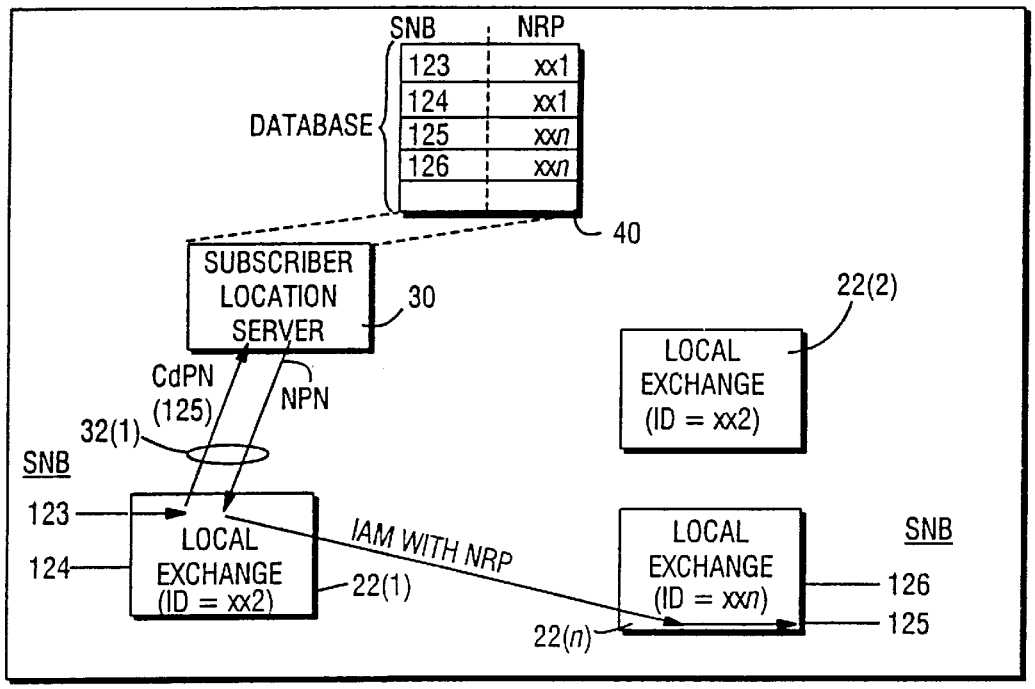
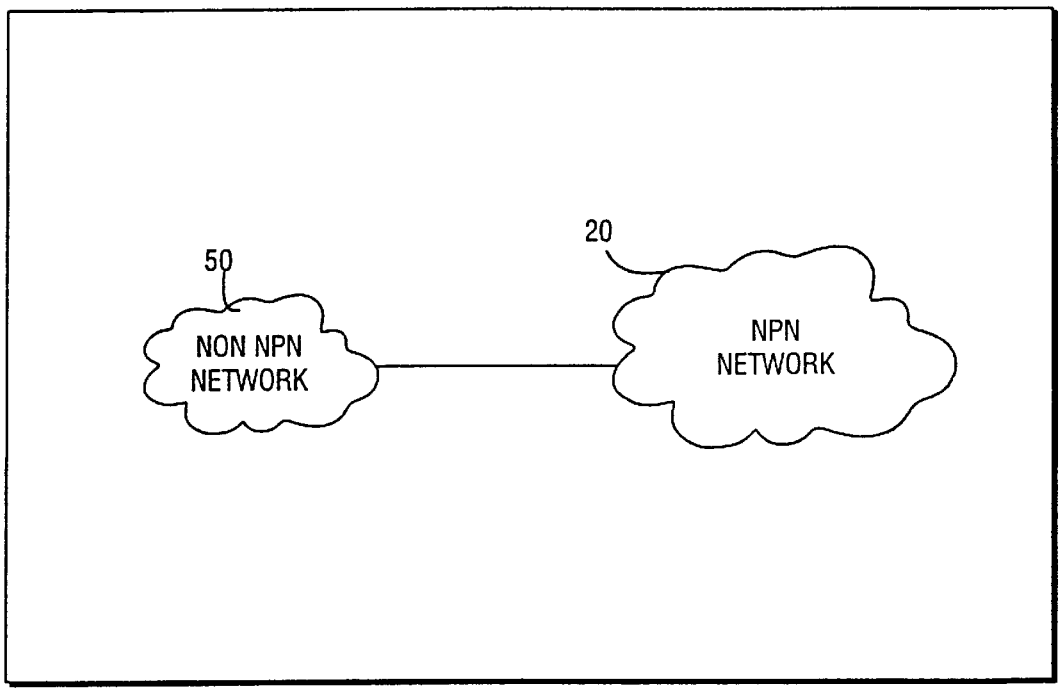
Fig. 6

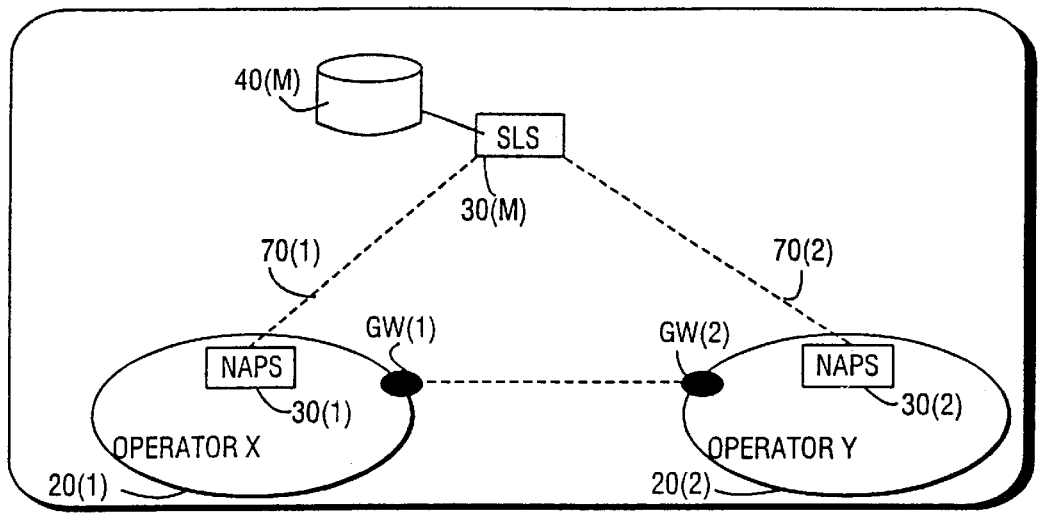
Fig. 10
Fig. 10A
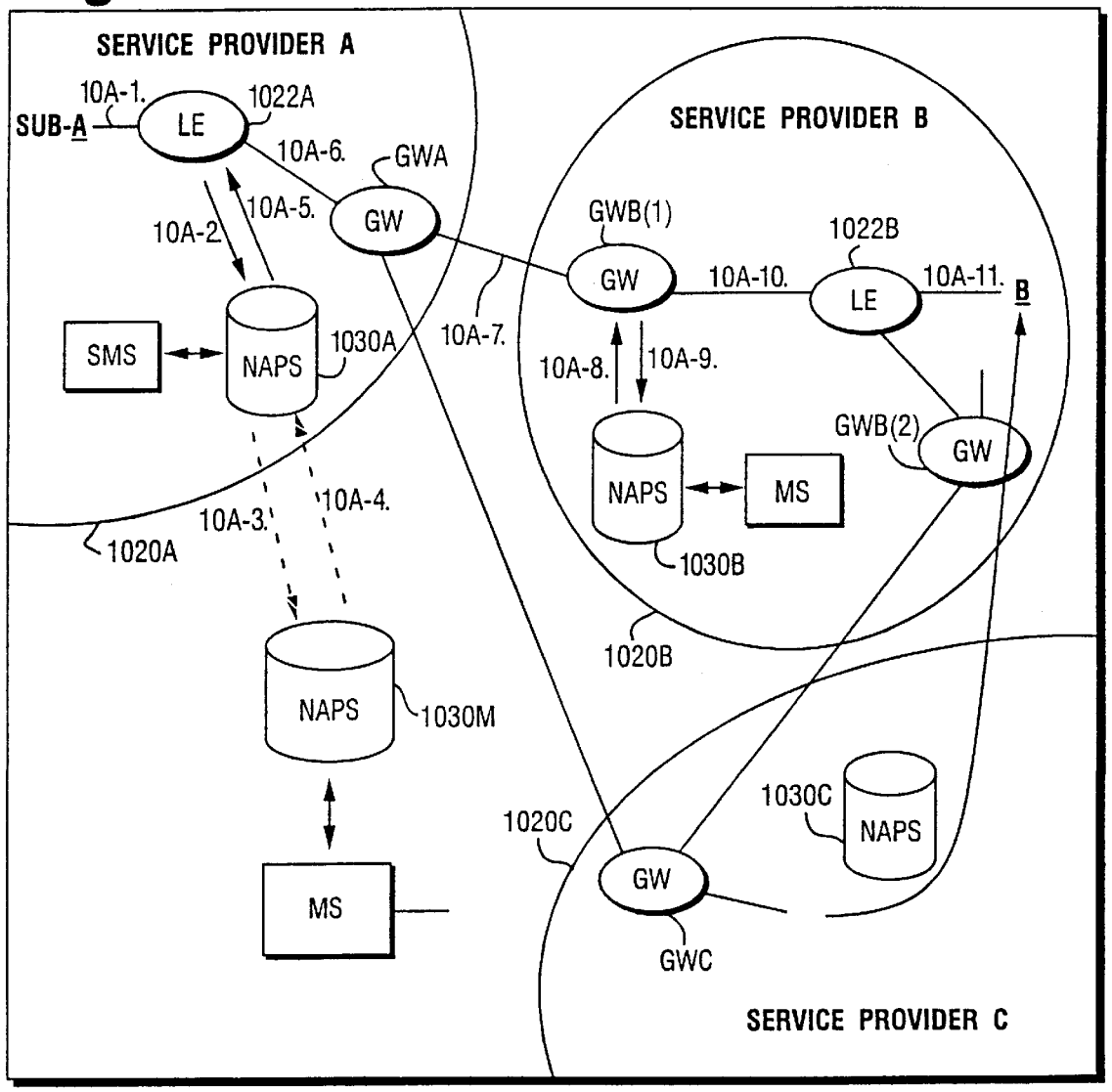

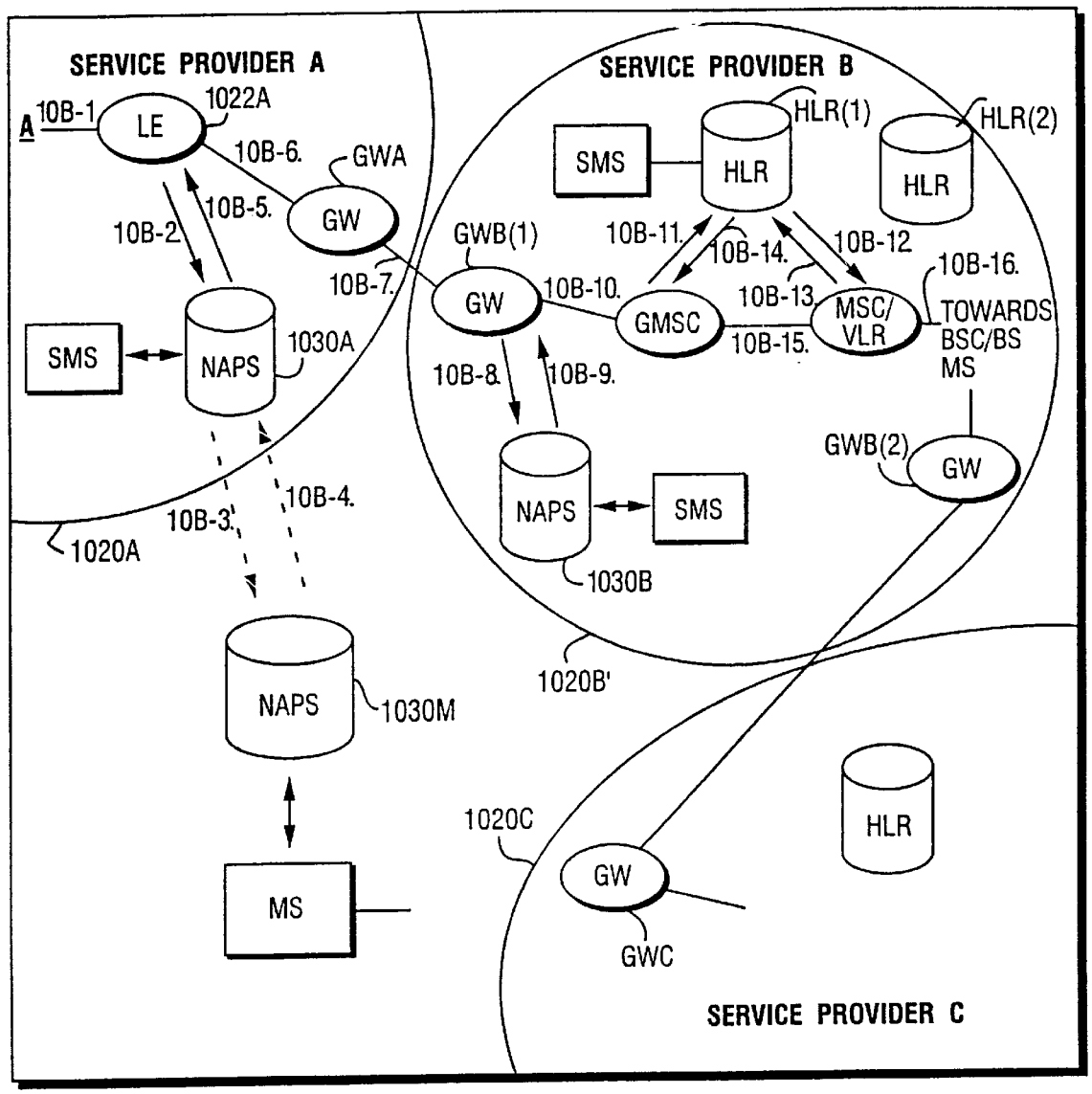
Fig. 10B
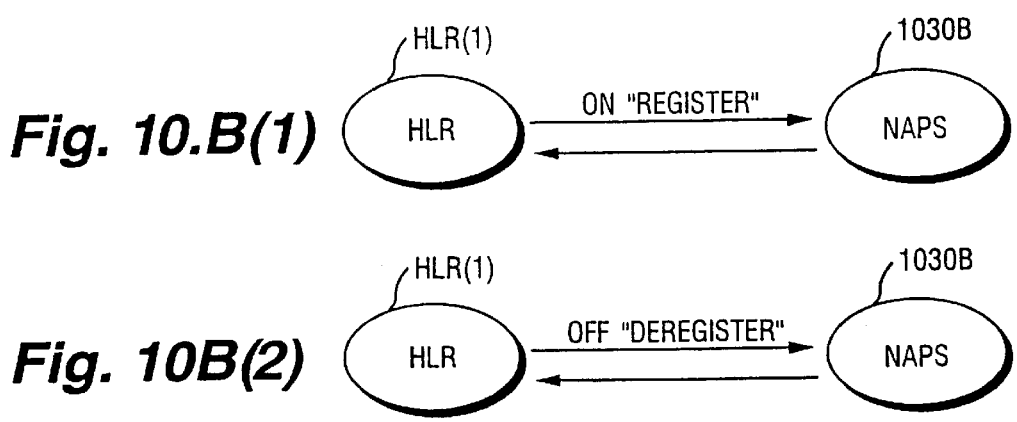
Fig. 10.B(1)
Fig. 10B(2)

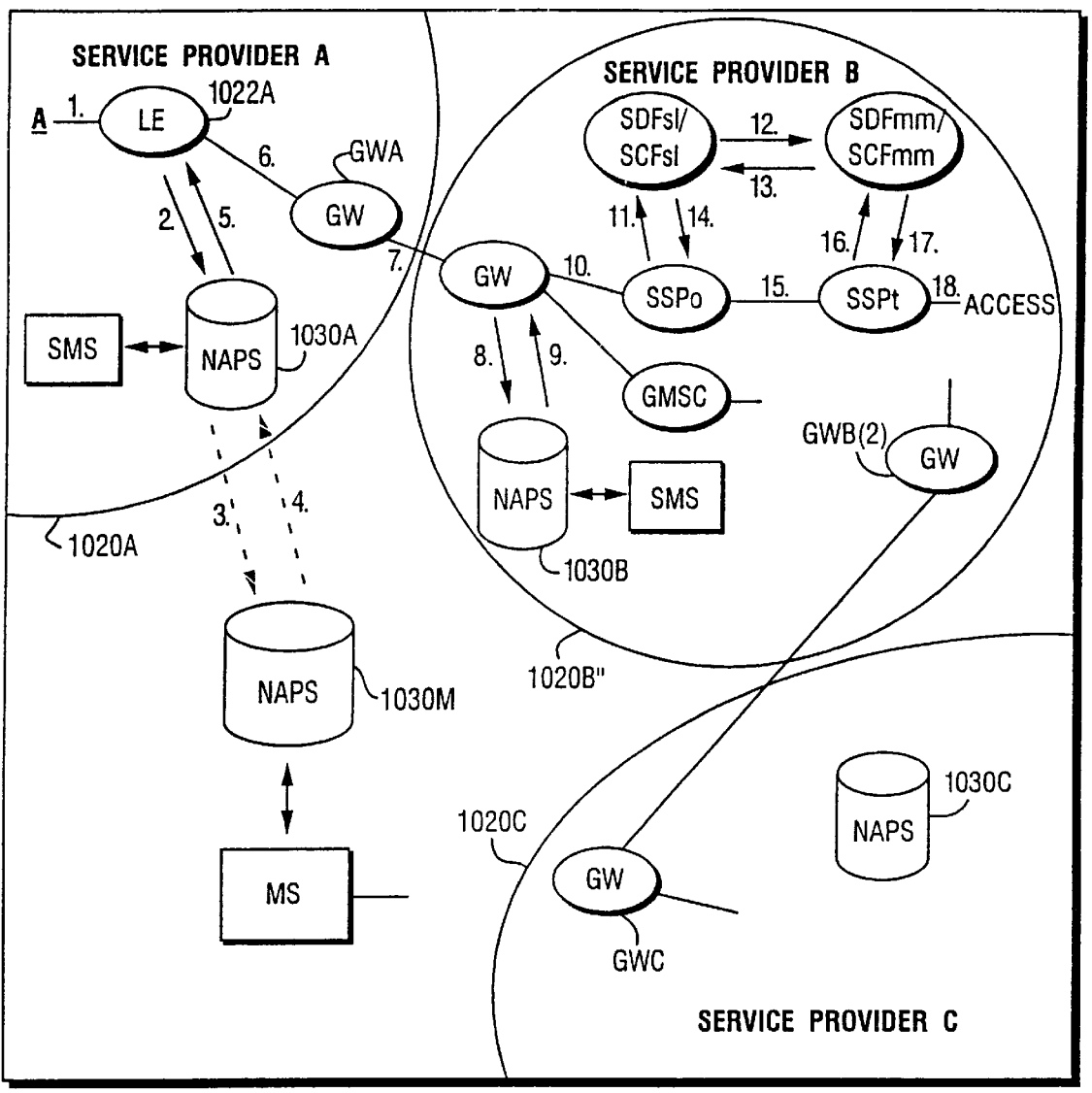
Fig. 10C
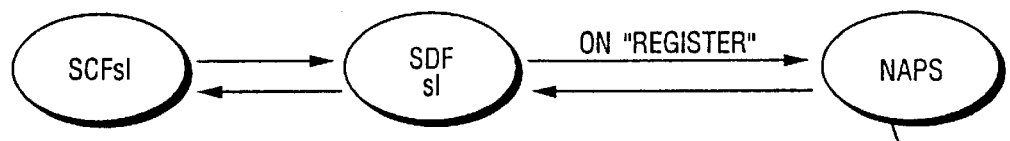
Fig. 10C(1)
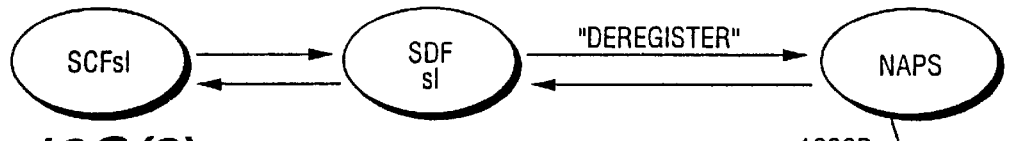
Fig. 10C(2)

Fig. 11
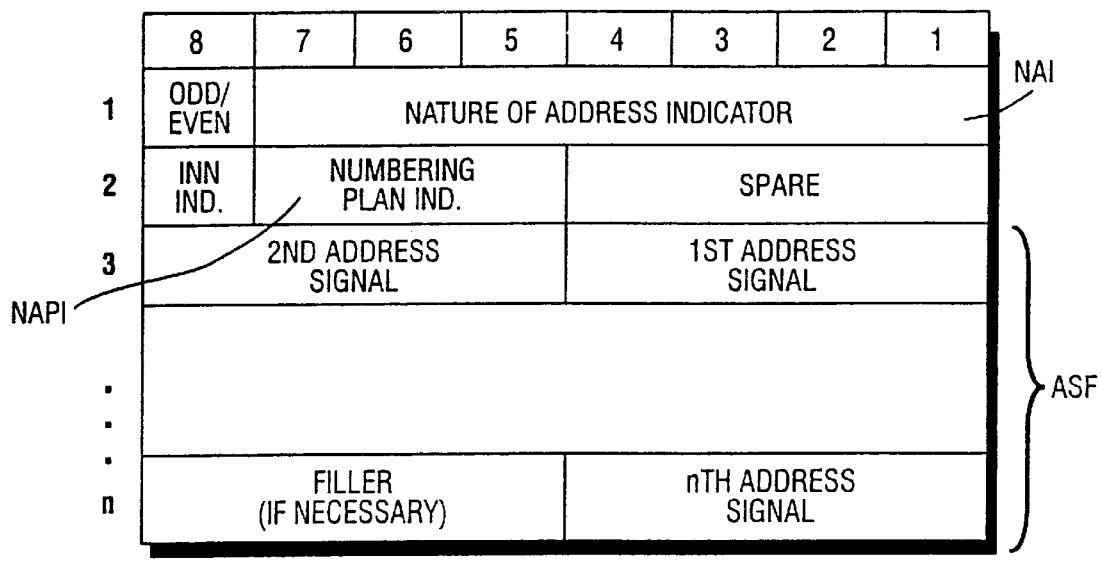
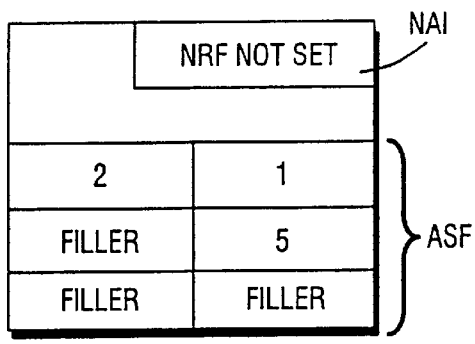
Fig. 11A
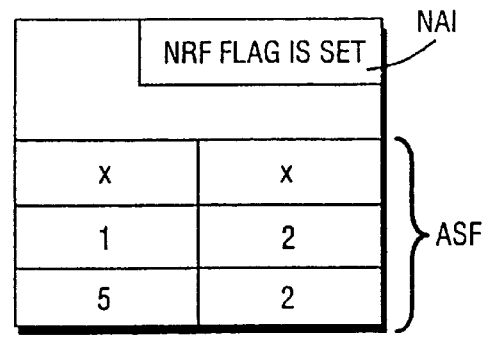
Fig. 11B 6,134,316

TELECOMMUNICATIONS NETWORK WITH RELOCATEABILITY OF SUBSCRIBER NUMBER

BACKGROUND

1. Field of Invention

This invention pertains to telecommunications systems, and particularly to the routing of calls through a telecommunications system for a relocated subscriber and location of any telecommunications system resources.

2. Related Art and Other Considerations

A telecommunications network typically includes a number of physical nodes, often referred to as local exchanges, to which subscribers are connected. The local exchanges are generally connected in the telecommunications network by other physical nodes, known as transit exchanges.

To simplify the routing of calls through the network and to have a good structure of a telephone numbering plan, each local exchange is allocated one or more unique exchange number groups. The telephone number of a subscriber typically includes both an exchange number group (typically a 10,000 number block) for the exchange to which a subscriber is connected, and a number in that group which is peculiar to the subscriber. For example, a subscriber having a telephone number "881-1657" is connected to a local exchange having an exchange number group "881", and within that group the subscriber has a subscriber number of "1657". The subscriber's telephone number is published or otherwise circulated as his directory telephone number e.g., in a telephone directory or book.

A common way of routing a call through a telecommunications network to a final destination is to use the directory telephone number of the called party (e.g., the called subscriber). In particular, the called party's directory telephone number occupies an address signal field of an ISUP parameter known as the "Called Party Number" parameter ("CdPN"), with the "Called Party Number" parameter ("CdPN") being a routing or address message utilized for routing purposes.

Using the directory telephone number of the called party for routing purposes has numerous problems, particularly when a subscriber physically relocates. If the relocating subscriber wants to keep his original directory number, he must be connected by a special physical line to his same local exchange. Such physical connection is quite expensive when the subscriber has moved far away from the local exchange. If the relocation is such that the subscriber's connection to the telecommunications network changes from an old local exchange to a new local exchange, on the other hand, the provider of the telecommunications network is not able to accommodate relocation of the subscriber without changing the subscriber's directory telephone number.

Changing a directory telephone number in the event of relocation of a subscriber occasions expense and effort for both the subscriber and the telecommunications provider. For the provider, it is expensive to administer the changes of directory telephone numbers when a subscriber relocates from one area to another. The administration required by the provider includes both efforts to define available new numbers in the new location (i.e., at the new local exchange) and to update the published directory. The relocated subscriber incurs expense in providing notice of the new directory number to potential callers (friends and business contacts). If such notice is not provided or retained by the potential callers, calls may not be placed to the relocated subscriber. Loss of calls to a relocated subscriber can result in loss of social or business opportunity.

Various mollifying measures are currently available to a relocated subscriber. One measure is to provide the caller who dials an old directory number with a audible message announcing the new directory number of the relocated subscriber, which new directory number must be noted and dialed by the caller. Another measure is automatic forwarding of the call from the old directory number to the new directory number. Yet another measure is a mechanical reconnection of the subscriber line to the new local exchange for the relocated subscriber. In a further measure, known as "drop back", a terminating exchange, upon receiving a call and detecting that its former subscriber has moved, sends a "release" message containing the number to which the call should be forwarded.

None of the remedial measures described above are entirely satisfactory. The audible message and automatic forwarding are typically only temporary services. Moreover, these services tax network resources. For the audible message, switching resources are utilized in the local exchange to which the relocated subscriber was formerly connected. In the case of automatic call forwarding, network signalling and hardware resources are required, leading to loss of capacity and revenue for the network provider. Mechanical reconnection may solve the problem in a small area, but is very expensive if not impossible to implement on a large scale. Moreover, hardware in the exchanges is not designed or intended for frequent physical reconnections of subscriber lines. The "drop back" approach is precarious when different service providers are involved in the relocation, and may spawn curious side effects if the subscriber changes service or access types.

A station number portability arrangement for a private network is described in U.S. Pat. No. 4,754,479 to Bicknell et al. The Bicknell arrangement allows a subscriber who is ported from an original switch to a new switch to retain an originally assigned number regardless of any numbering plan constraints. All switches of a relocateablity cluster contain a common database which identifies the present location of subscribers via a switch identity. The common data base must be provided at each switching node.

Bicknell-type databases at each physical node of a public telecommunications system would be formidable to implement and maintain. Consider, for example, a public telecommunications network covering an entire country and including hundreds or even thousands of exchanges. How difficult it would be to update the databases at each exchange when a subscriber relocates. Moreover, the memory requirements exacted by having a copy of the database at each exchange would be considerable.

What is needed therefore, and an object of the present invention, is an efficient and economical way of facilitating relocation of a subscriber from one exchange to another within a telecommunications network without changing the subscriber's directory telephone number. Such a relocation-accommodating system must be compatible with ISDN (integrated services digital network) services, especially those based on ETSI/CCITT standards.

SUMMARY

A telecommunications domain having subscriber number relocateablity includes a plurality of physical nodes or exchanges between which calls are connected and a subscriber location server which is connected to and accessed by each of the plurality of exchanges in the domain. Each exchange has a unique exchange identifier (ID). Generally, when a call is placed to a subscriber in the relocateability domain, a first exchange the call encounters queries the subscriber location server. When queried, the subscriber location server returns a Network Routing Number (NRN) which includes a Network Routing Prefix (NRP). The Network Routing Prefix (NRP) is a node identifier (NI) for the local exchange to which the called party is connected. The exchange to which the NRN is returned prepares a routing message for the call by including the Network Routing Prefix (NRP) in an Address Signal Field (ASF) of a routing message and by setting a number relocateability flag (NRF) in the routing message. In an embodiment in which the routing message is the industry standard called party number parameter (CdPN), the exchange sets a number relocateability flag (NRF) in an Nature of Address Indicator (NAI) field and replaces the former contents of the ASF with a concatenation of the NRP and the former contents of the ASF (e.g., the called party's directory number).

The subscriber location server has a changeable mapping of subscriber numbers and exchange identifiers. Subscriber directory numbers are not used for routing calls through the domain. Rather, the node identifier (NI) in the form of the Network Routing Prefix (NRP) is used to route calls to a terminating locating exchange.

A change of connection (e.g., relocation) of a called subscriber from a first exchange to a second exchange involves a remapping, in a database of the subscriber location server, of the subscriber number from an exchange identifier of the first exchange to an exchange identifier of the second exchange. Subscribers can move freely within the domain and retain the same directory number. The subscriber need not advise the public of a new directory number when the subscriber relocates. The present invention is easily implemented and also provides efficient and effective way e.g., of temporarily rerouting calls for a subscriber to a different exchange.

When desired for such purposes of redundancy, loading sharing, or hierarchial structure, for example, a plurality of subscriber location servers can be employed.

In some embodiments a subscriber location server augmented with additional intelligence is known as a network number and address portability server (NAPS). A NAPS is particularly effective for providing additional network services. For example, NAPS of the present invention can be easily and economically utilized to perform a "look ahead" function. Moreover, with NAPS it is possible to define the same subscriber number in several local exchanges and then, in the subscriber location server, to make a determination as to which local exchange the call to such subscriber number should be routed. Such determination can be made on any of a number of bases, such the originating caller's geographies, time of day, calling party number, etc. It is also possible for the subscriber location server to route calls to different networks depending on the type of access being used by the called party at a certain moment, e.g., if a cellular phone is being used or a fixed phone.

The present invention also provides for number relocateability when changing from one operator or service provider to another (e.g., from a fixed to a GSM service provider and vice versa) and when changing access service types (e.g., from fixed POTS to ISDN or GSM). Thus, the relocateability features of the invention are not restricted to physical location relocateability.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 3 is a schematic view depicting call connection of a local call in accordance with a mode of the present invention.

FIG. 4 is a schematic view depicting call connection of a call between differing local exchanges in accordance with a mode of the present invention.

FIG. 5 is a schematic view depicting call connection of a call between differing local exchanges for a subscriber who has relocated in accordance with a mode of the present invention.

FIG. 6 is a schematic view generically showing interfacing of a number relocateablity domain of the present invention to a network which does not have number relocateablity.

FIG. 10 is a schematic view of a hierarchy of telecommunications network number relocateablity domains according to an embodiment of the present invention.

FIG. 10A is a schematic view of a plurality of domains maintained by different service providers.

FIG. 10B is a schematic view of a plurality of domains maintained by different service providers, with one of the domains providing mobile telecommunications.

FIG. 10B(1) and FIG. 10B(2) are schematic drawings illustrating communication between NAPS of the invention and a Home Location Register (HLR) for permitting a subscriber to use a same directory number for both fixed and mobile telephones.

FIG. 10C is a schematic view of a plurality of domains maintained by different service providers and illustrating applicability of number relocateability to Cordless Terminal Mobility (CTM) calls.

FIG. 10C(1) and FIG. 10C(2) are schematic drawings illustrating communication between NAPS of the invention and functions involved with CTM for permitting a subscriber to use a same directory number for both fixed and CTM equipment.

FIG. 11 is a schematic view of a format of an industry standard called party number parameter.

FIG. 11A and 11B are schematic drawings showing example formats of a called party number (CdPN) parameter according to modes of the invention.

DESCRIPTION OF THE PREFERRED EMBODIMENTS

Figure 1:
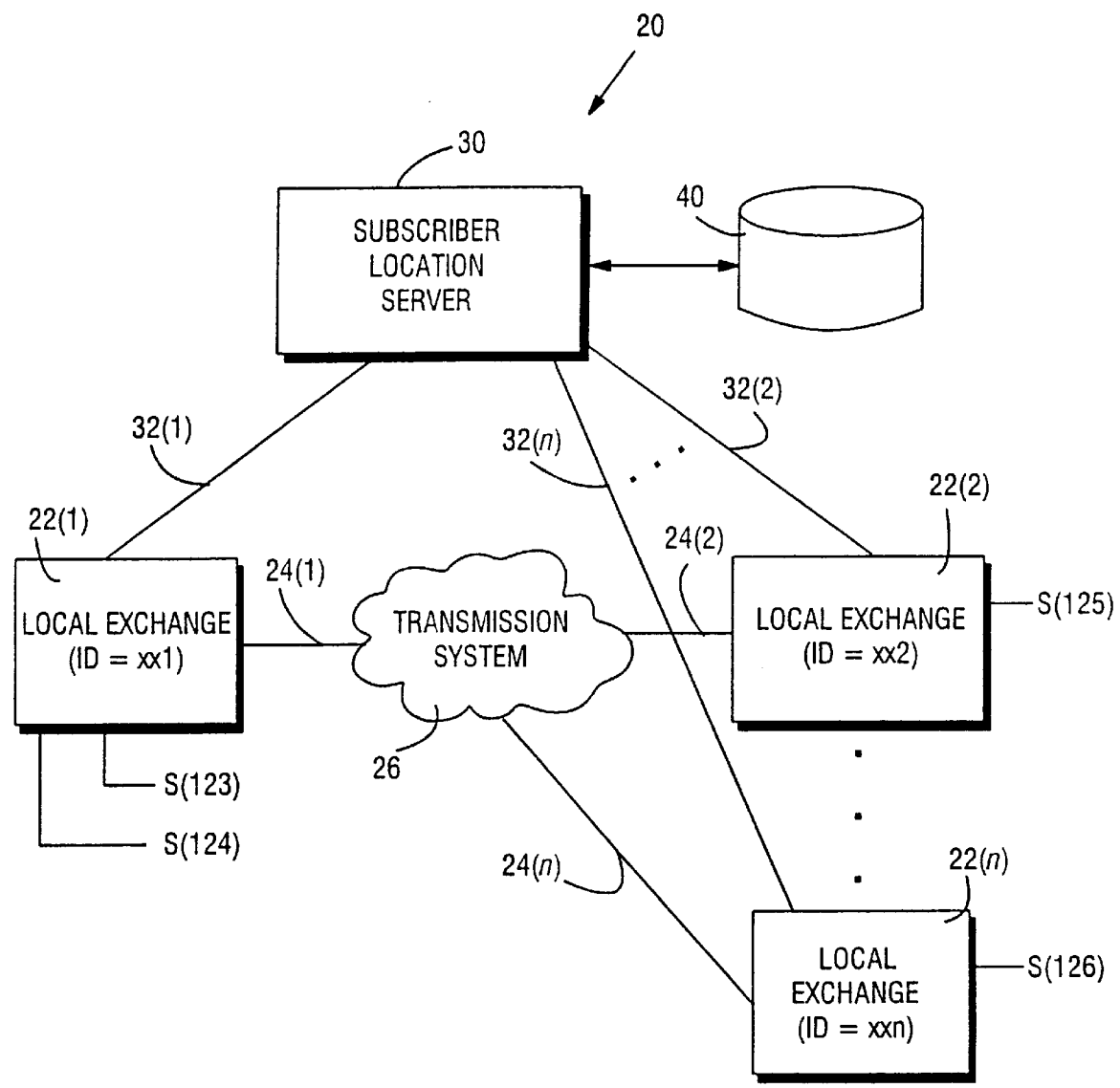
FIG. 1 is a schematic view of a telecommunications network with a number relocateablity domain according to an embodiment of the present invention.

FIG. 1 shows a number relocateablity domain 20 of a telecommunications network. Domain 20 includes a plurality of local exchanges 22(1) through 22(n) which are connected by respective lines (e.g., trunk lines) 24 to a transmission system 26. Domain 20 also includes a subscriber location server (SLS) 30. Subscriber location server 30 is connected to each of the local exchanges 22(1), 22(2), . . . 22(n) by respective subscriber location links 32(1), 32(2), . . . 32(n). In a simple embodiment, transmission system 26 can be physical lines connecting local exchanges 22, but typically comprises one or more transit exchanges, as is understood by the person skilled in this art.

Each of the local exchanges 22(1), 22(2), . . . 22(n) is assigned a unique, non-directory exchange identifier ID. As shown in FIG. 1, local exchange 22(1) is assigned ID=xx1; local exchange 22(2) is assigned ID=xx2; and so forth with local exchange 22(n) being assigned exchange ID=xxn. Preferably, the exchange IDs are not visible to subscribers nor are they published in a directory for subscribers. As explained hereinafter, the exchange or node identifier is utilized for the locating of subscribers and as a Network Routing Prefix (NRP) for routing of calls through domain 20.

All subscribers S within domain 20 are connected to a local exchange 22. Each local exchange 22(1), 22(2), . . . 22(n) serves a plurality of subscribers S. FIG. 1 illustrates that, among the subscribers served by local exchange 22(1) are subscribers S(123) and S(124), with local exchanges 22(2) and 22(n) serving at least subscribers S(125) and S(126), respectively. Although each local exchange 22 serves many subscribers, for sake of simplified illustration only these subscribers are illustrated. In the examples herein illustrated, subscriber S(123) has a subscriber number (SNB) of "123", subscriber S(124) has a subscriber number of "124", and so forth (the parenthetical of each subscriber being that subscriber's subscriber number [SNB]).

Subscriber location server 30 includes a database 40 which contains entries for each subscriber S in domain 20. As illustrated in more detail in other drawings, database 40 associates each subscriber number (SNB) with a Network Routing Prefix (i.e., the exchange or node identifier for the local exchange 22 to which the subscriber S is currently physically connected for service). Database 40 of subscriber location server 30 has a changeable mapping of subscriber numbers (SNBs) and exchange identifiers (Exchange Ids).

As will be mentioned subsequently, when augmented with additional intelligence, subscriber location server 30 is also known as the network number and address portability server (NAPS). Additional intelligent functions performed by a NAPS include such network services as "look ahead" services and routing of a call to a selected one of a plurality of exchanges dependent on various criteria.

Although not illustrated in FIG. 1, subscriber location server 30 has a protocol interface or user part which enables server 30 to communicate with other elements of domain 20. The protocol implemented by the protocol interface can be a very simple protocol used solely for the communications described herein, or a more advanced protocol, for example the Intelligent Network Application Part (INAP) protocol. The protocol can be carried by ITU-T signaling system no. 7 or any other networked protocol.

As explained below, within the domains herein described, such as domain 20 of FIG. 1 for example, for routing purposes the exchange or node identifier, herein also used such as Network Routing Prefix (NRP), is included in an address signal field of a routing message such as a called party parameter (CdPN). Thus, in domains of the present invention, the address field of the existing ISUP parameter CdPN that normally contains only the number of the called party is replaced by a concatenation of the NRP and the directory number of the called party.

FIG. 11 shows the format of a called party parameter (CdPN) of the ITU-T Rec. Q.763 standard, an industry standard. The called party parameter (CdPN) is a routing message utilized to route calls between exchanges of a telecommunications system. The CdPN format of FIG. 11 includes a seven bit Nature of Address Indicator ("NAI") in its first byte; a Number Plan Indicator ("NAPI") in bits 5–7 of its second byte; and an Address Signal Field ("ASF") in its last n-3 bytes. The Number Plan Indicator ("NAPI") is a field that has one of 8 different values, and which indicates to what type of plan the called subscriber subscribes (e.g., ISDN or not). The Nature of Address Indicator ("NAI") is an ISUP parameter having one of 128 values, many of which are spare (i.e., not yet assigned). The NAI is conventionally employed to indicate such things as whether the number is a national number, and international number, etc. The Address Signal Field ("ASF") has n-2 number of four bit nibbles, each nibble representing an address signal. The most significant address signal is sent first, subsequent address signals are sent in successive 4-bit nibbles.

The present invention utilizes a number relocateability flag NRF which is used to indicate whether the called number associated with a CdPN parameter has the number relocateability capabilities of the present invention. In one embodiment, the NRF is chosen as one of the spare values of the NAI. Hereinafter a setting of the relocateability flag NRF is understood for such embodiment to be a setting of an appropriate value in the NAI field as illustrated in FIG. 11.

It should be understood that the present invention is not limited to use of the industry standard called party parameter CdPN, but instead that other types of routing messages can be utilized. It so happens that FIG. 1 and other figures referenced herein employ Network Routing Prefix (NRPs) that illustratively have three digits. The use of three digits in the figures is merely for convenience and by way of example, it being understood that the invention is not restricted to three digits and that a lesser or (more likely) greater number of digits can be employed as allowed by the protocols implemented in each case. Nor is the invention specific to lengths or ordering of the other fields shown in FIG. 11.

The Network Routing Prefix (NRP) of the present invention is an example of an exchange or node identifier which is included in the address signal field (ASF) of the routing message in such a manner as to precede the directory number of the called party. It should be understood that the node identifier (NI) can be included in positions other than leading bit positions of the ASF of the routing message.

Figure 2:
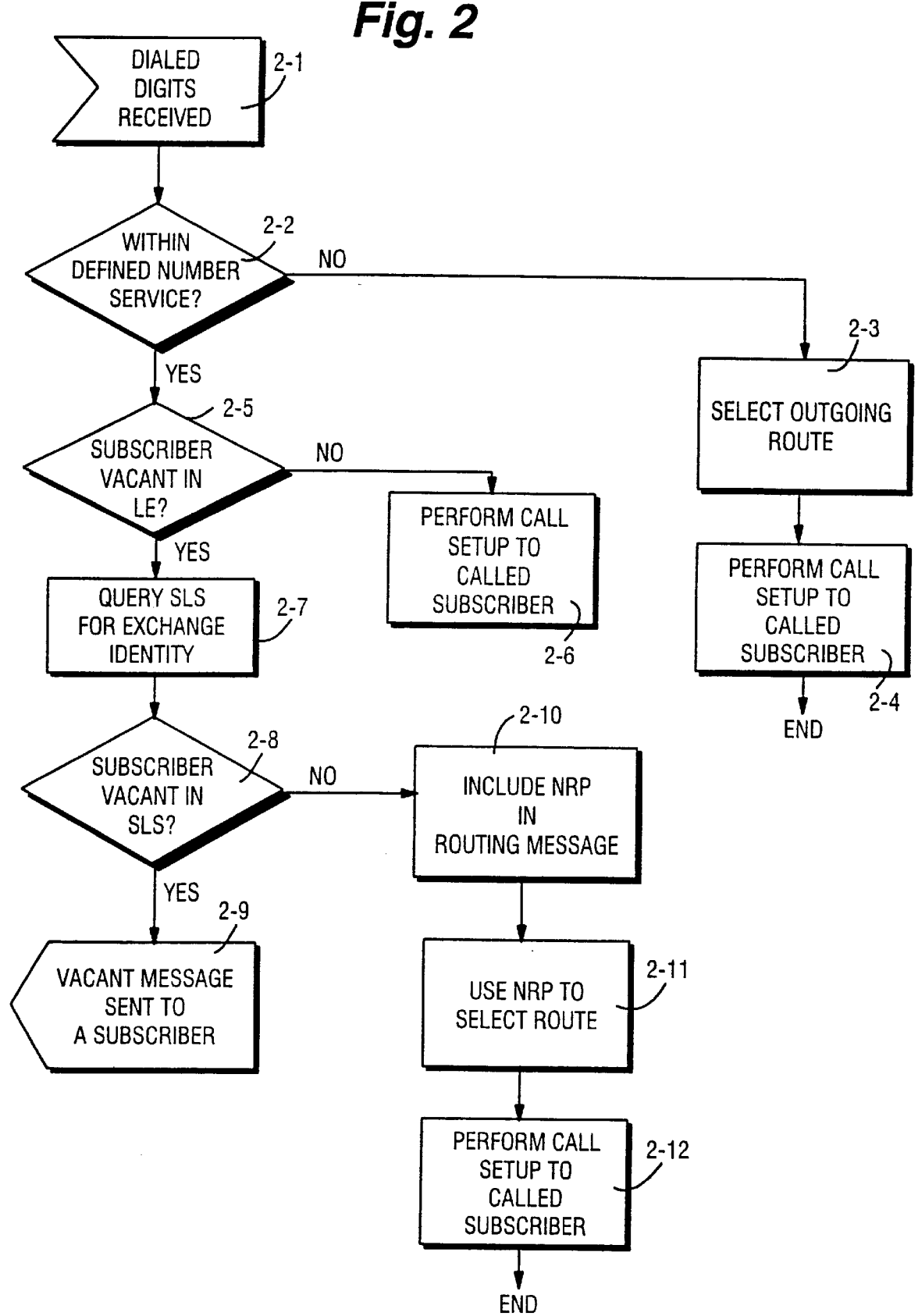
FIG. 2 is a flowchart showing steps executed by a subscriber exchange in accordance with the present invention.

FIG. 2 shows steps executed by a local exchange 20 which belongs to domain 20 of the present invention. In connection with the description of the steps of FIG. 2, reference with also be made to FIG. 3 and FIG. 4 for illustrating differing types of calls which are processed by local exchange 20. In particular, FIG. 3 is employed to illustrate processing of a local call wherein local exchange 22(1) connects subscribers S(123) and S(124) [both of which are connected to exchange 22(1)]. FIG. 4 is employed to illustrate processing of a non-local call from calling subscriber S(123) [who is connected to local exchange 22(1)] to called subscriber S(125) [who is not connected to exchange 22(1), but instead to exchange 22(2)].

At step 2–1, originating local exchange 22 collects the digits of the called subscriber's number (SNB) as dialed by the calling subscriber. At step 2—2, the originating local exchange 22 determines whether the called subscriber's number is within a predefined number series having the number relocateability function of the present invention. If the called subscriber's number (SNB) is within the predefined series, the call is to be connected to another exchange within domain 20. Otherwise the subscriber belongs to a number series (i.e., block of numbers) which exists outside of domain 20, in which case steps 2–3 and 2–4 of FIG. 2 are executed. Steps 2–3 and 2–4 involve the use of standard routing principles. At step 2–3 the local exchange 22 uses the called party number parameter CdPN to select an outgoing route to the called subscriber. At step 2–4, the local exchange 22 performs call set up to the called subscriber.

If, at step 2—2, the originating local exchange 22 determines that the called subscriber's number is within the predefined number series of the domain, at step 2–5 the originating local exchange 22(1) further determines whether the called subscriber's number, although within the predefined series, is vacant or no longer listed with local exchange 22(1). If the determination at step 2–5 is negative, the called subscriber is known to be connected to the same local exchange as the calling subscriber. Accordingly, at step 2–6 local exchange 22(1) performs call set up to the called subscriber. Such a case is illustrated in FIG. 3 in which the called subscriber [S(124)] is connected to the same local exchange 22(1) as the calling subscriber [S(123)]. At step 2–6, the local exchange 22 performs call set up to the called subscriber [S(124)] without consulting subscriber location server 30. Instead, the call is established according to conventional routing principles using the called party's directory number in the called party number parameter (CdPN) at the local exchange 22. FIG. 3 shows local exchange 22(1) itself connecting a call between calling subscriber S(123) and called subscriber S(124).

If it is determined at step 2–5 that the called subscriber's number, although within the predefined series, is vacant or no longer listed with local exchange 22(1), step 2–7 is executed. Execution of steps 2–7, 2–8 and 2–10 through 2–12 is represented diagrammatically by FIG. 4, which illustrates the case of a non-local call being processed by local exchange 22(1). In particular, FIG. 4 illustrates local exchange 22(1) processing a call from calling subscriber S(123) to called subscriber S(125).

At step 2–7, local exchange 22(1) transmits a query on subscriber location link 32(1) to subscriber location server 30, passing with the query the called party number parameter CdPN. Upon receipt of the query with the CdPN parameter, subscriber location server 30 consults its database 40 to determine the exchange or node identifier, e.g., the Network Routing Prefix (NRP), for the local exchange which currently services the called party. As shown in FIG. 4, database 40 has an entry for each subscriber in domain 20, with each entry comprising a field for the called party's directory number and an associated field for the Network Routing Prefix (NRP) for the local exchange currently serving the called party. For example, when the called party number "125" is passed as a parameter to subscriber location server 30, server 30 checks database 40 and determines that the record corresponding to subscriber 125 has the value of "xx2" in its NRP field, i.e., the exchange ID of local exchange 22(2).

As part of the query of database 40 of server 30 at step 2–7, at step 2–8 subscriber location server 30 determines whether the called party number for the called party is vacant (e.g., not included or without a corresponding NRP). If the called party number for the called party is vacant, at step 2–9 the calling party is notified by message (e.g., audible or text) that there is no listing for the number dialed by the calling party. In this regard, in response to the query of step 2–7, the subscriber location server 30 responds with a message indicating a vacancy or lack of entry in database 40 for the CdPN. Local exchange 22(1) then generates the message to the calling party.

On the other hand, if the number dialed by the calling party and passed to subscriber location server 30 at step 2–7 does exist in database 40 and has a corresponding NRP, at step 2–10 subscriber location server 30 provides a Network Routing Number (NRN) to local exchange 22(1). At step 2–10 subscriber location server 30 provides the NRN including as its Network Routing Prefix (NRP) the value obtained from data base 40 (e.g., the exchange ID of the terminating exchange [e.g., exchange ID "xx2" for exchange 22(2) in the present example for called party S(125)]. The local exchange 22(1) replaces the address signal field (ASF) of the CdPN with a concatenation of the NRP and the called party's directory number).

FIG. 11A and FIG. 11B show examples of called party number parameter (CdPN) for the scenario depicted by FIG. 4 (subscriber S123 connected to local exchange 22(1) calling subscriber S125 connected to local exchange 22(2). In particular, FIG.11A shows that the party number parameter (CdPN) prior to query of subscriber location server 30. FIG.11A shows that the address signal field (ASF) of parameter (CdPN) contains only the SNB or directory number of the called subscriber S125. FIG. 11B, on the other hand, shows the transformation of the parameter (CdPN) at step 2–10. In accordance with the transformation, the number relocateability flag NRF in the NAI field is set, and the address signal field (ASF) is replaced with a concatenation of the Network Routing Prefix (NRP) [e.g., xx2] and the called party's directory number [e.g., 125]. It should be understood hereinafter, even though not explicitly stated, that insertion of an NRP into an ASF is always accompanied by a setting of the number relocateability flag to indicate presence of the NRP in the ASF.

At step 2–11 local exchange 22(1) uses the NRN obtained from server 30 (obtained at step 2–10) to select a route to the terminating exchange (e.g., exchange 22(2) in the present example). At step 2–12 the local exchange 22 performs call set up to the terminating exchange over the selected route. The called party number parameter (CdPN), transformed as above described at step 2–10, is sent as an initial address message [IAM] over the network.

When a transit exchange receives the routing message (e.g., an initial address message [IAM]), its analysis of the message leads to a route to the terminating exchange which is associated with the network routing prefix (NRP). The IAM message is thereafter sent to the terminating local exchange. The terminating exchange is able to recognize calls routed to it on the basis of the NRP, and removes the NRP prefix prior to analyzing the remainder of the routing message for the CdPN. Thereafter the rest of the message is analyzed and the called subscriber is identified by the remainder of the ASF field.

It should be noted in the above scenario that there is no requirement that all calls to other exchanges be routed via a transit exchange, and that tie trunks are also permitted so that a call might also be routed via a tie trunk to a transit exchange in case of congestion or error in the ordinary trunk to the transit exchange.

Although the steps of FIG. 2 illustrate for sake of example only local exchange 22(1) as processing calls, it should be understood that comparable steps are executed by any of the local exchanges of domain 20. Moreover, in another mode of the invention, step 2–5 of FIG. 2 can be omitted so that a search of subscriber location server 30 is always made, even for calls between a calling party and a called party connected to the same local exchange. Such omission of step 2–5 is efficient when there is low probability that the called subscriber will be found as connected to the same local exchange as the calling subscriber, thereby rendering it more efficient to make inquiry of subscriber location server 30 for every call.

As mentioned above, FIG. 3 shows local exchange 22(1) itself connecting a call between calling subscriber S(123) and called subscriber S(124). FIG. 4, on the other hand, illustrates local exchange 22(1) processing a call from calling subscriber S(123) to called subscriber S(125).

FIG. 5 shows how the present invention accommodates relocation of subscriber S(125) from local exchange 22(2) [as discussed above with reference to FIG. 4] to local exchange 22(n). FIG. 5 particularly shows that the Network Routing Prefix (NRP) for subscriber 125 has been changed in database 40. In particular, rather than the NRP field for subscriber number 125 in database 40 being "xx2", after relocation of subscriber 125 to local exchange 22(n) the NRP field for subscriber number 125 is "xxn" (see FIG. 5). Thus, performance of step 2–10 of FIG. 2 after relocation as shown in FIG. 2 would result in "xxn125" being included in the address signal field (ASF) of the routing message passed on line 32(1) to local exchange 22(1).

Since subscriber S(125) as above discussed is entered into database 40 of subscriber location server 30, subscriber S(125) is able to relocate easily within domain 20 as above discussed. Subscriber S(125) is thus said to have a "location portability function" (LOP).

Figure 6A:
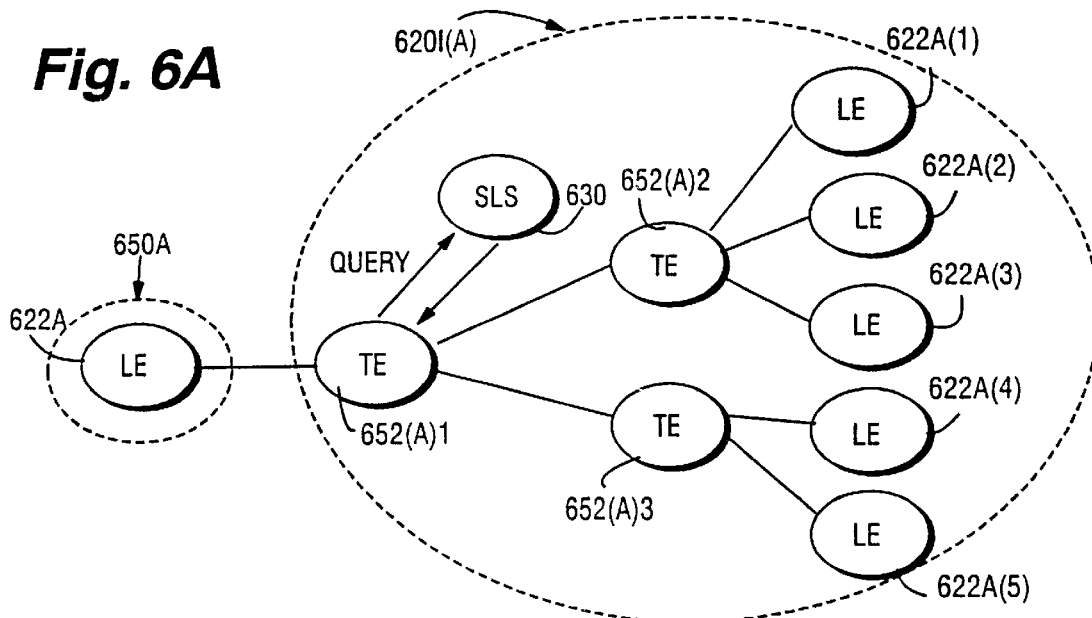
FIG. 6A, FIG. 6B, and FIG. 6C show scenarios of connection between number relocateablity domains to examples of respective networks which do not have number relocateablity.
Figure 6B:
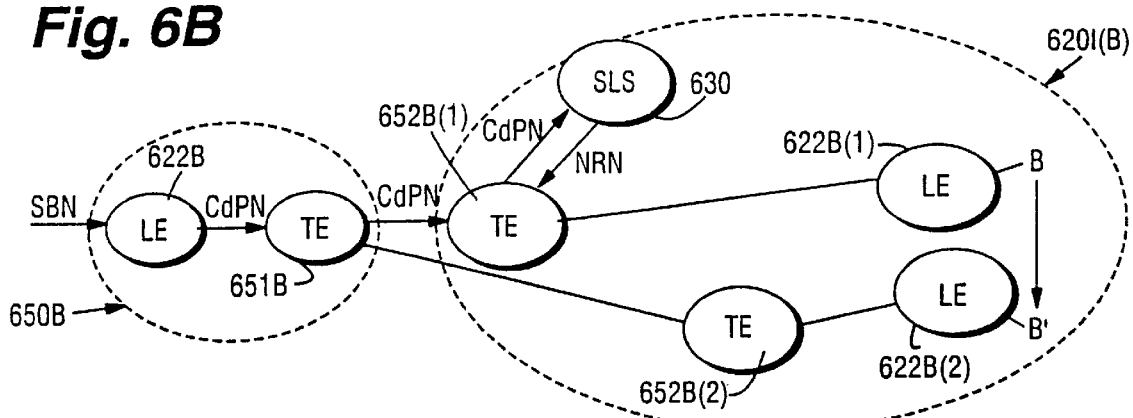
Figure 6C:
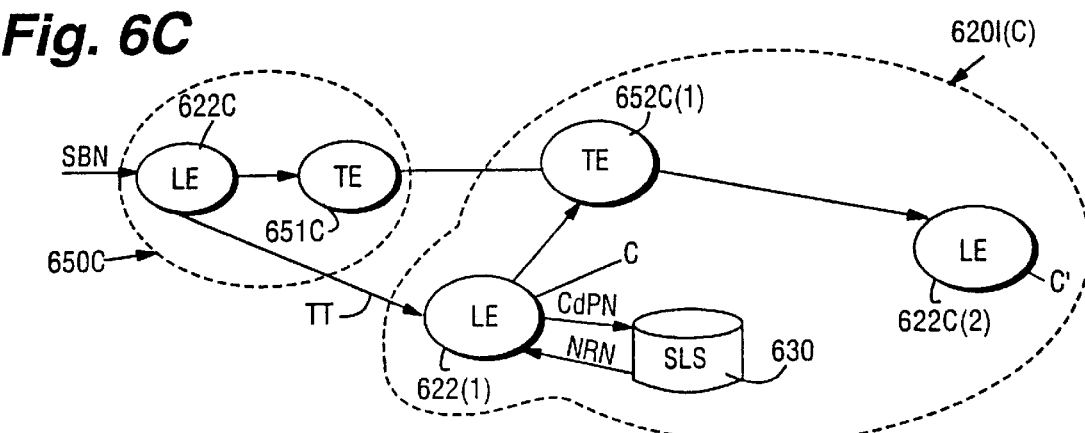

FIG. 6 shows generically the connection of a number relocateability domain 20 to a network 50, the subscribers in network 50 not having number relocateability. FIG. 6A, FIG. 6B, and FIG. 6C show scenarios of connection between number relocateablity domains 620I(A), 620I(B), 620I(C), respectively, and examples of respective networks 650A, 650B, and 650C which do not have number relocateablity.

FIG. 6A shows backward compatibility of a number relocateability domain (e.g., NRN domain) 620I(A) to a local exchange 620A which has not been upgraded with the number relocateability feature. Domain 620I(A) includes transit exchanges 652A(1), 652A(2), and 652A(3), as well as local exchanges 622A(1) through 622A(5). Transit exchange 652A(1) is connected to the non-NRN domain local exchange 622A, as well as to transit exchanges 652A (2) and 652A(3) and subscriber location server 630. Transit exchange 652A(2) is connected to local exchanges 622(1) through 622(3); transit exchange 652A(3) is connected to local exchanges 622(4) through 622(5). In a scenario of operation of FIG. 6A, a calling party connected to local exchange 622A places a call to a called party resident in domain 620I(A). In such event, since local exchange 622A is unable to query subscriber location server 30, the parameter CdPN is passed to transit exchange 652A(1). Transit exchange 652A(1) (after determining that the called party is in the number series served by domain 620I(A)) makes the inquiry using the CdPN parameter received from local exchange 622A. Thus, FIG. 6A illustrates that, for calls incoming from outside of domain 620I(A), the first transit exchange encountered is the exchange which queries the subscriber location server 630. Upon receipt of the NRN from subscriber location server 630, transit exchange 652A (1) routes the call to the called party in domain 620I(A) based on the NRP.

FIG. 6B illustrates a situation in which a calling party is connected to local exchange 622B, which in turn is connected to transit exchange 651B, with both exchanges 622B and 651B being in a network 650B which does not have number relocateability. Number relocateability domain 620I (B) of FIG. 6B includes transit exchanges 652B(1) and 652B(2). Transit exchange 652B(1) is connected to transit exchange 651B, to subscriber location server 630, to transit exchange 652B(2), and to local exchange 622B(1). Transit exchange 652B(2) is connected to transit exchange 651B, to transit exchange 652B(1), and to local exchange 622B(2). In the FIG. 6B illustration, a subscriber having number relocateability has moved from a location B (connected to local exchange 622B(1)) to a location B' (connected to local exchange 622B(2)). Calling parties in domain 620I(B) will have their calls to the subscriber who moved to location B' routed directly to location B' via transit exchange 652B(2). However, if a calling party connected to local exchange 622B dials the directory number for the subscriber who has relocated from location B to location B', the call is initially routed by transit exchange 651B using the CdPN parameter toward local exchange 622B(1) [at which the called subscriber previously resided]. However, upon entering domain 620I(B), transit exchange 652B(1) traps the incoming call and makes the query to subscriber location server 630. Transit exchange 652B(1) receives the Network Routing Number for the relocation subscriber, and accordingly routes the call via transit exchange 652B(2) to local exchange 622B(2).

FIG. 6C shows a situation in which a local exchange 622C not having number relocateability is connected by a tie trunk TT to local exchange 622C(1) having number relocateability. Network 650C which does not have number relocateability includes local exchange 622C and transit exchange 651C. Domain 620I(C) includes transit exchange 652C(1) and the local exchanges 622(1) and 622(2). Local exchange 622(1) is connected to subscriber location server 630. Suppose a subscriber moves from location C (connected to local exchange 622(1)) to location C' (connected to local exchange 622(2)), and that a calling party connected to local exchange 622C calls the relocated subscriber, and the called subscriber (now at location C') has the number portability function of the present invention. However, thinking that the subscriber is still located at location C, local exchange 622C routes the call using the CdPN parameter to local exchange 622(1). However, local exchange 622(1) traps the incoming call and queries the subscriber location server 630. As a result of the NRN received from subscriber location server 630, local exchange 622(1) routes the call using the NRP to local exchange 622(2) via transit exchange 652C(1).

Figure 7:
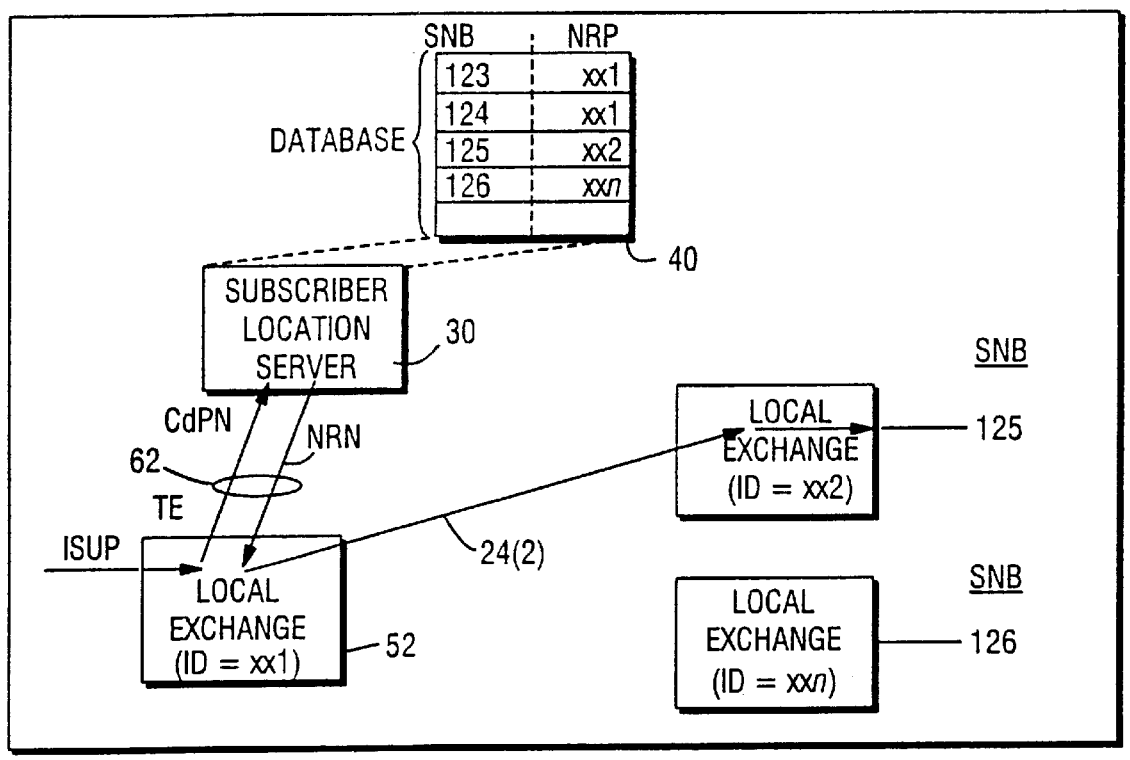
FIG. 7 is a schematic view depicting call connection of a call incoming to a number relocateablity domain from a network outside the number relocateablity domain.

FIG. 7 depicts receipt of a call incoming to number relocateablity domain 20' of FIG. 6 from a network outside the number relocateablity domain (such as network 50 of FIG. 6). FIG. 7 particularly illustrates receipt of an incoming call at transit exchange 52, the incoming call being destined for called subscriber S(125). In like manner with the operations above discussed with reference to FIG. 2, FIG. 3, and FIG. 4, transit exchange 52 executes a step analogous to step 2–11 of FIG. 2 to query (on line 62) subscriber location server 30. In the example illustrated in FIG. 7, the value of the CdPN parameter passed in query is "125". Subscriber location server 30 searches database 40 in the manner previously discussed and generates a Network Routing Number (NRN) which includes an appropriate NRP for transmission to transit exchange 52. In the illustrated example, the NRN sent to transit exchange 52 includes the value "xx2125". For transit exchanges, the analysis of the called subscriber's number is designed so that the prefix NRP (same as the exchange or node identifier) points out a route to the terminating exchange having the prefix fetched from the subscriber location server 30.

Subscribers S of domain 20' can dial numbers of subscribers which are outside of domain 20' (e.g., subscribers in non-relocateablity network 50 of FIG. 6). When a subscriber outside of domain 20' is called, the called is routed according to existing standard procedures.

Figure 8:
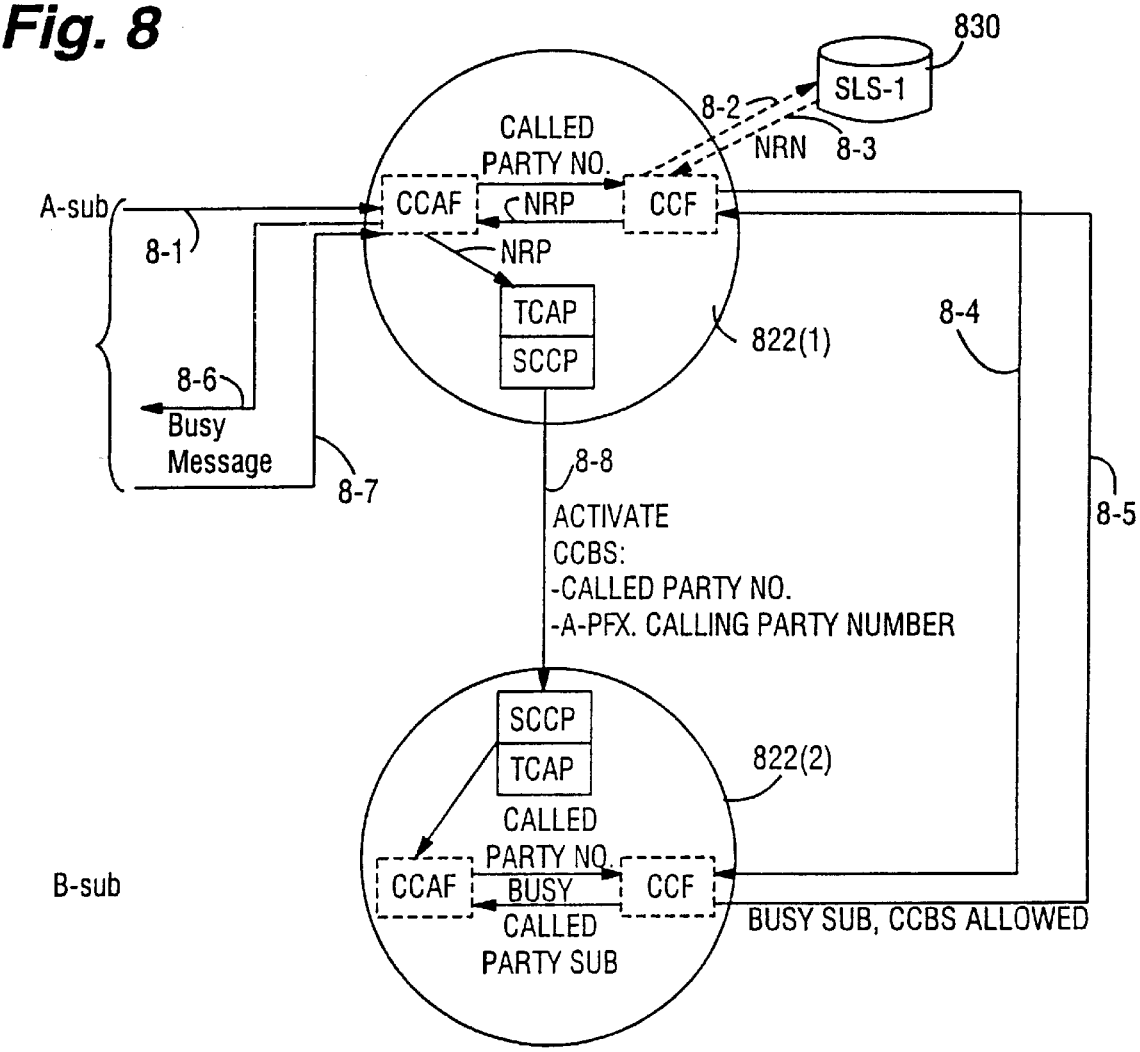
FIG. 8 is a schematic view depicting a sequence of actions occurring in accordance with the present invention between two exchanges in a number relocateability domain in connection with provision of call back services.

FIG. 8 shows a sequence of actions occurring between two local exchanges 822(1) and 822(2) in connection with provision of call back services, such as CCBS (call completion to busy subscriber) or CCNR (call completion at no response), when both local exchanges 822(1) and 822(2) are in the same number relocateability domain. As shown in FIG. 8, each local exchange 822 includes a CCAF, CCF, TCAP, and SCCP. The CCAF is the Call Control Access Function. The CCF is the Call Control Function. The TCAP is the Transaction Capabilities Application Part; the SCCP is the Signalling Connection Control Part.

The sequence of actions depicted in FIG. 8 is as follows. As a first action 8-1, a calling party (e.g., a subscriber known as "A-sub") connected to local exchange 822(1) dials the number of a called party (e.g., a subscriber known as "B-sub") connected to local exchange 822(2). The dialed digits are received at CCAF and forwarded to CCF. In like manner as previously illustrated with respect to step 2–7 of FIG. 6, at action 8-2 the number of the called party (CdPN) is sent [from CCF of exchange 822(1)] to subscriber location server 830 (i.e., as a parameter of the query). At action 8-3, server 830 returns to the CCF of local exchange 822(1) an NRP of the local exchange [the ID of exchange 822(2)] of the called subscriber. At action 8-4, the CCF of local exchange 822(1) initiates a call to the CCF of local exchange 822(2), the initial address message (IAM) of the signaling including the prefix (exchange ID of the target exchange) and the directory number of the called party number in the address signal field of the routing message (CdPN).

The CCF of local exchange 822(2) determines that the called party number is listed with local exchange 822(2), and forwards the called party number to its CCAF. The CCAF determines that the called party is busy, and so advises the CCF of local exchange 822(2). Action 8-5 shows a busy condition signal being returned from the CCF of local exchange 822(2) to the CCF of local exchange 822(1). The returned busy condition signal also indicates that CCBS is allowed. Action 8-6 shows local exchange 822(1) advising subscriber A-sub with a busy message that the called party is busy.

By action 8-7, subscriber A-sub makes a CCBS request to local exchange 822(1) by action 8-7. In response, at action 8—8 local exchange 822(1) activates the CCBS feature at its TCAP/SCCP for the sending of a CCBS request to local exchange 822(2) using the prefix of local exchange 822(2) as previously fetched from subscriber location server 830 at action 8-2. Provided with the CCBS request to local exchange 822(2) is the exchange ID of the local exchange 822(1) of the calling party, so that the CCBS call back function can use it in the call back procedure.

Figure 8A:
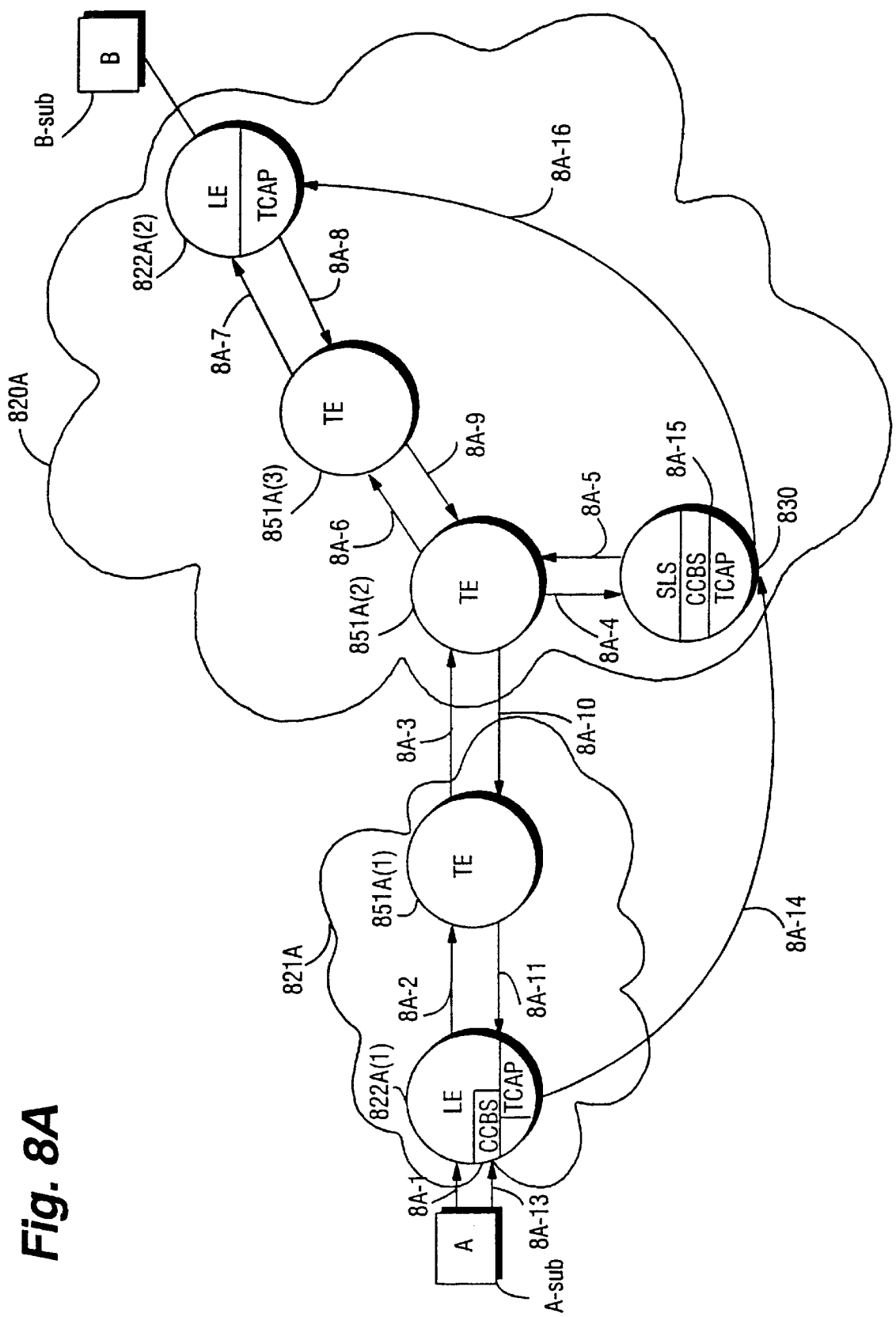
FIG. 8A is a schematic view depicting a sequence of actions occurring in accordance with the present invention between two exchanges, one of which is not in a number relocateability domain, in connection with provision of call back services.

In FIG. 8A, local exchange 822A(1) is in a network 821A which is not in a number relocateability domain; local exchange 822A(2) is in number relocateability domain 820A. FIG. 8A shows a sequence of actions occurring, in connection with provision of call back services (such as CCBS [call completion to busy subscriber] or CCNR [call completion at no response] when the calling party (subscriber A-sub) is connected to local exchange 822A(1) and the called party (subscriber B-sub) is connected to local exchange 822A(2).

Thus, local exchange 822A(1) is not in the number relocateablity domain 820, is incapable of querying the subscriber location server 830, and knows nothing about the Network Routing Prefix (NRP) utilized in domain 820. Instead, local exchange 822A(1) follows the conventional strategy (e.g., CCITT No. 7) of using the called party number CdPN for routing the CCBS request to the called party's local exchange. As described hereinafter with respect to FIG. 8A, in the present invention the call is routed to an appropriate subscriber location server 830. Server 830 analyzes the directory number of the called party in the CCBS request and creates a NRP, so that the CCBS request is forwarded to the local exchange of the called party, by using the created NRP as Global Title. The principles of the invention regarding the setting of the number relocation flag (e.g., NAI) on the ISUP/TUP "CdPN" parameter also applies when setting the Global Title on TCAP/SCCP (i.e, the Global Title also contains an NAI and NPI as well as CdPN).

At action 8A-1 of FIG. 8A, calling party sub-A dials the directory number of the called subscriber (sub-B). At action 8A-2 local exchange 822A(1) fills the address signal field (ASF) of the CdPN message used as an Initial Address Message (IAM) with the called subscribers directory number and forwards the IAM message to transit exchange 851A(1). By action 8A-3 transit exchange 851A(1), being in non-relocateability network 821A, forwards the IAM to transit exchange 851(2) in relocateability domain 820A.

Action 8A-4 involves transit exchange 851(2) sending a query to subscriber location server 830 to discern the location of subscriber B-sub. Action 8A-5 shows subscriber location server 830 revising the IAM (i.e., the CdPN) so that its address signal field (ASF) includes the Network Routing Prefix (NRP) of subscriber B-sub, and setting the number relocateability flag (NRF) to indicate the presence of the NRP in the ASF. Actions 8-5 also involves forwarding the revised IAM back to transit exchange 851(2). By action 8A-6 the IAM including the NRP is forward from transit exchange 851(2) to transit exchange 851(3); by action 8A-76 the IAM including the NRP is forward from transit exchange 851(3) to local exchange 822A(2).

Action 8A-8 of FIG. 8A shows a busy message (e.g., REL on ISUP) sent from local exchange 822A(2) to transit exchange 851A(3). Similarly transmission of the busy message back to local exchange 822A(1) is shown by actions 8A-9 through 8A-11. In response to receipt of the busy message, local exchange 822A(1) sends a busy tone to subscriber sub-A (action 8A-12).

Action 8A-13 shows subscriber sub-A activating the CCBS (call completion to busy subscriber) feature at the CCBS function of local exchange 822A(1). At action 8A-14 the CCBS request is forwarded using the called party number CdPN to subscriber location server 830, and particularly to the TCAP (Transaction Capabilities Application Part). At action 8A-15, subscriber location server 830 creates a Network Routing Prefix (NRP). At action 8A-16 the CCBS with the NRN obtained from action 8A-15 is used to route the CCBS request to the correct local exchange (i.e., local exchange 822A(2) to which subscriber sub-B is connected).

Figure 9:
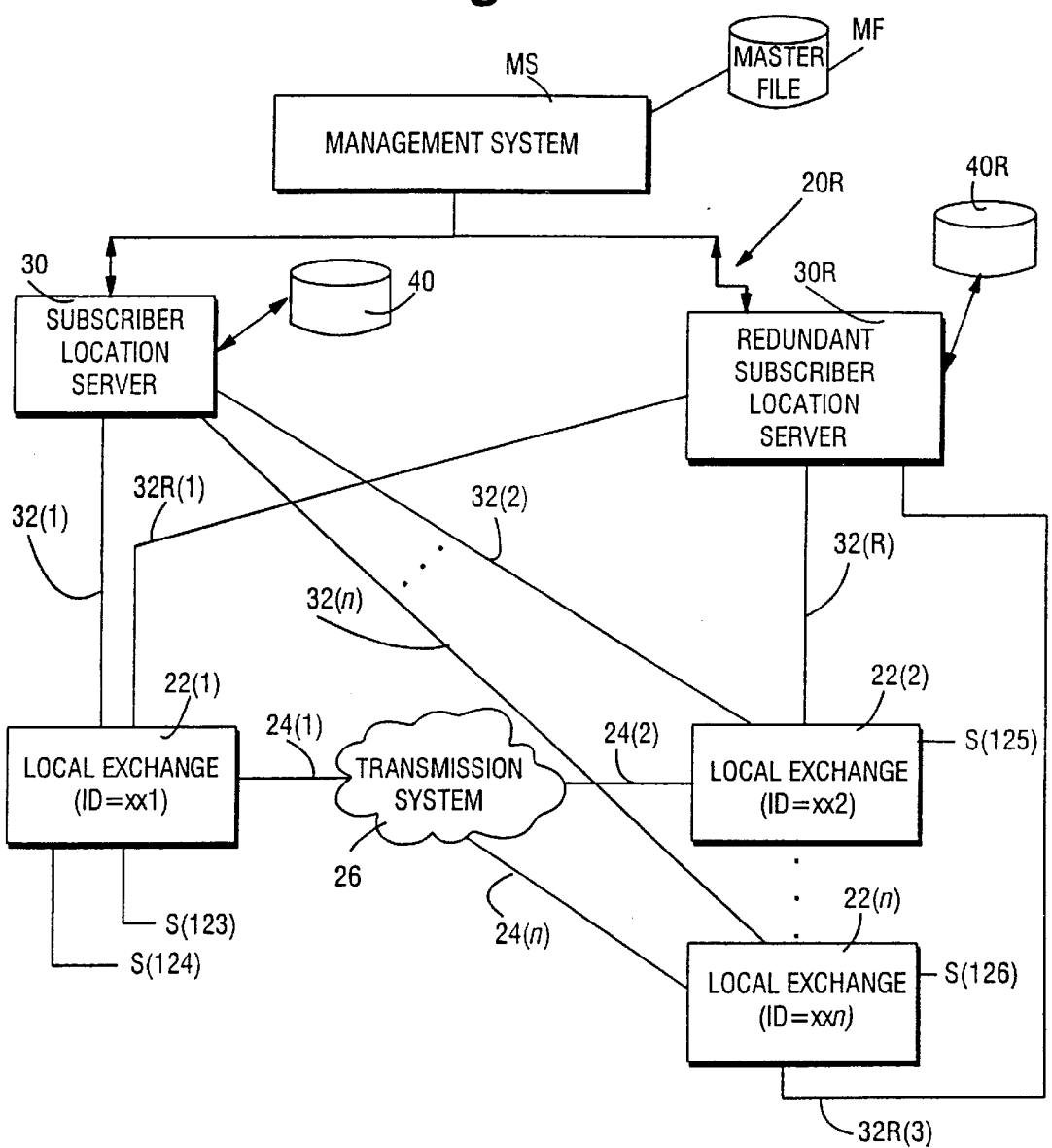
FIG. 9 is a schematic view of a telecommunications network number relocateablity domain with redundancy according to an embodiment of the present invention.

FIG. 9 is a schematic view of a telecommunications network number relocateablity domain 20R which is provided with redundancy. Domain 20R of FIG. 9 has all the elements of domain 20 of FIG. 1 (which elements are similarly numbered in both FIG. 1 and FIG. 9), and additionally has a redundant subscriber location server 30R. As in domain 20 of FIG. 1, redundant subscriber location server 30R is also connected to each of the plurality of exchanges in domain 20R. Links 32R(1)–32R(n) are provided for connecting the exchanges 22(1)–22(n), respectively, to redundant subscriber location server 30R. Redundant subscriber location server 30R maintains a database 40R which, for the example of FIG. 9, is identical to database 40. Management system MS connected to both servers 30 and 30R. Management system MS accesses a data base MF in which the master file of subscriber relocateability data is maintained. Master file MF is used, for example, for downloading to data bases of either server 30, 30R.

In the event that subscriber location server 30 has a malfunction or must be taken out of service for maintenance, etc., redundant subscriber location server 30R is utilized in lieu of server 30. In one mode of operation, at a prescribed interval (e.g, once a week or as otherwise specified by operator input), management system MS may order a consistency check of data in both databases 40 and 40R. In a consistency check, the data is compared and any mismatch is reported. Corrective actions in the case of mismatch may be ordered manually or semi-automatically. In another mode of operation, comparison check is not necessary assuming that the master file MF is timely maintained by management system MS and downloadable to servers 30, 30R.

The configuration of FIG. 9 may alternatively be utilized to spread the load between the two identical subscriber location servers 30 and 30R. There are several methods of load sharing. As a first method, the SLS-related functions of the local exchanges 22 may select for that local exchange a "primary subscriber location server." The selection of a primary subscriber location server can be made on basis of number group (e.g., number group xxx selecting server 30 when no fault and number group yyy selecting server 30R when no fault). Alternatively, the selection of primary subscriber location server can be made dynamically on the fly using an internal statistical distribution function. As a second method, an SCCP parameter known as "Global Title" ("GT") may be set to the dialed or dialing number in order to tie one primary NAPS (e.g., server 30) to handle certain customers and another NAPS (e.g., server 30R) to handle other customers. As a third method, the same SLS functions of a local exchange always selects a corresponding primary NAPS by semi-permanent exchange data, then different SLS functions are assigned different NAPS, i.e., one NAPS is primary to some SSPs of a local exchange and secondary to some SSPs of the local exchange. When the configuration of FIG. 9 is utilized for load sharing rather than pure redundancy, in the event of a failure of one of the location subscriber servers 30, 30R, the non-failing server may not be able to carry the entire load of the failing server.

Figure 9A:
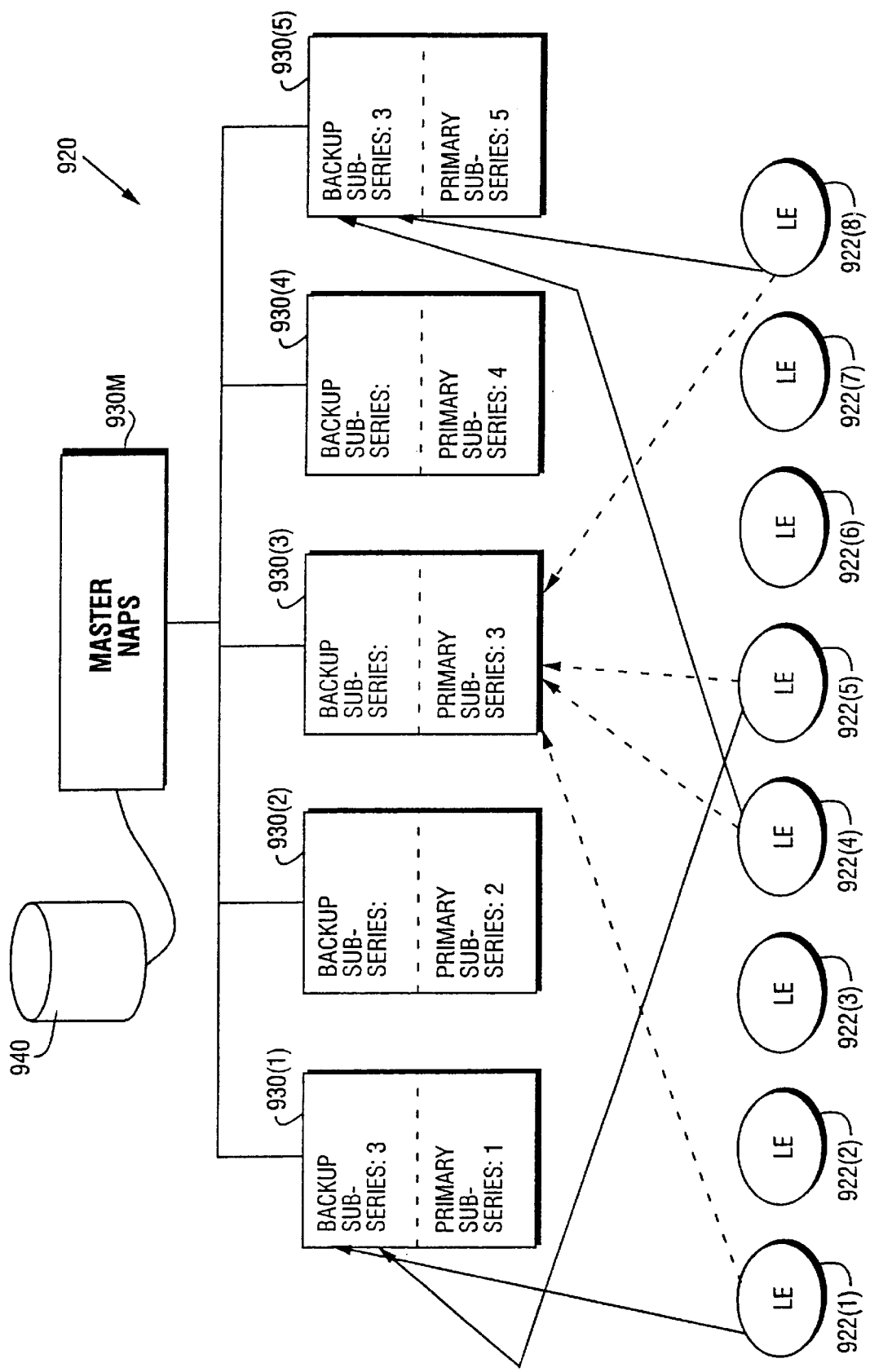
FIG. 9A is a schematic view of a telecommunications network number relocateablity domain with redundancy and load sharing according to an embodiment of the present invention.

FIG. 9A shows domain 920 with a redundancy system comprising a master NAPS 930M and a plurality of subseries-specific NAPS 930(1) through 930(5), all serving local exchanges 922(1) through 922(8). The domain 920 is comprised of five subdomains, each subdomain being associated with a subset of the series of numbers served by the entire domain 920. Each subset of subscriber numbers is served by a corresponding one of the subseries-specific NAPS 930(1) through 930(5). For example, a first subset of the series being associated with NAPS 930(1), a second subset of the services being associated with NAPS 930(2), and so on. When a call is placed at each local exchange 922, the local exchange searches each of the five subsets of the series to determine which of the five NAPS 930(1)–930(5) should be queried. Thus, in lieu of checking a single list to determine whether the called party is in the relocateability domain, the exchange checks as many as five lists to determine the subset of the series of domain 920 to which the called subscriber belongs. The local exchange 922 then makes a query to the appropriate NAPS 930 based on the list upon which the called subscriber's number is found, and in return receives a Network Routing Prefix in like manner as above described.

Thus, each of the five NAPS 930(1)–930(5) is assigned a primary subseries. In addition, two or more of the NAPS 930 has backup storage locations for storing, if necessary, one or more backup subseries. In the example shown in FIG. 9A, NAPS 930(3) is normally queried for subscribers in subseries 3 of domain 920, as shown by broken lines from local exchanges 922(1), 922(4), 922(5), and 922(8). However, if NAPS 930(3) should be out-of-service, in FIG. 9A the local exchanges 922 query a NAPS other than NAPS 930(3). In this regard, upon detecting an out-of-service condition at NAPS 930(3), master NAPS 930M copies its master database for subseries 3 into backup storage locations of selected NASPS 930, in particular of NAPS 930(1) and 930(5) as shown in FIG. 9A. In addition, master NAPS 930M notifies each of the local exchanges 922 as to which NAPS 930 it should query for subseries 3 called subscribers. In the particular situation shown in FIG. 9A, master NAPS 930M has directed that odd numbered local exchanges 922 should query NAPS 930(1) while even number local exchanges 922 should query NAPS 930(5). Thus, rather than attempting to query NAPS 930(3) [as indicated by broken lines], local exchanges 922(1) and 922(5) query NAPS 930(1) for subseries 3 called subscribers. Similarly, rather than attempting to query NAPS 930(3) [as indicated by broken lines], local exchanges 922(4) and 922(8) query NAPS 930(5) for subseries 3 called subscribers. Thus, the FIG. 9A illustration is one example of how non-identical NAPSes can be utilized to provide redundancy on a shared basis. Moreover, it should be realized that master NAPS 930M can pre-assign and prestore the backup subseries, so that copying of the master file for a subseries need not be deferred until such time as a NAPS is taken out of service.

FIG. 10 shows a hierarchical provision of subscriber location servers, and particularly in the context of a plurality of domains 20(1) and 20(2). Domains 20(1) and 20(2) are provided with subscriber location servers [NAPS] 30(1) and 30(2), respectively, each of which serve a plurality of exchanges (unillustrated) in their respective domains. Telephonic communication between domains 20(1) and 20(2) occurs between gateways GW(1) and GW(2) of the respective domains. A master subscriber location server [NAPS] 30(M) is provided and is accessed by the NAPSs 30(1) and 30(2) over links 70(1) and 70(2). When a calling subscriber belonging to domain 20(1) dials a number for a called subscriber in domain 20(2), NAPS 30(1) first makes a search of its database 40(1) for the called subscriber's number (SNB). If the called subscriber's SNB is not found in NAPS 30(1), the master NAPS 30(M) is queried. Assuming that the master NAPS 30(M) has the sought SNB, the master NAPS 30(M) returns to NAPS 30(1) a prefix which is indicative of a route to gateway GW(2) of domain 20(2). The prefix is added in front of the dialed number (SNB) in the signaling sent to gateway GW(2) of domain 20(2). When the signal reaches a transit exchange at gateway GW(2), a search is made of NAPS 30(2) of domain 20(2) in order to determine to which local exchange of domain 20(2) the called subscriber is currently connected.

FIG. 10A shows a plurality of domains 1020A, 1020B, 1020C. The domains 1020A, 1020B, 1020C can each be maintained by a different service provider. Domain 1020A has a gateway GWA which connects with gateway GWB(1) of domain 1020B and gateway GWC of domain 1020C; domains 1020B and 1020C are connected between gateways GWB(2) and gateway GWC. Domain 1020A has a local exchange 1022A which connects to gateway GWA and to subscriber location server 1030A. Domain 1020B has a local exchange 1022B which is connected to both gateways GWB(1) and GWB(2), gateway GWB(1) being connected to subscriber location server (NAPS) 1030B. For sake of simplicity no local exchange is shown in domain 1020C, although one or more local exchanges are included. Domain 1020C has a 1030C. Connected for accessability by all domains is master subscriber location server (NAPS) 1030M. Each of the subscriber location servers 1030A, 1030B, 1030C, and 1030M has an associated service management system (MS).

FIG. 10A shows actions involved when a subscriber sub-A in domain 1020A calls sub-B in domain 1020B. Action 10A-1 shows subscriber sub-A dialing the directory number of subscriber sub-B. At step 10A-2, local exchange 1022A queries subscriber location server 1030A to determine a network routing prefix for subscriber sub-B based on the dialed directory number. Subscriber location server 1030A determines that the directory number for subscriber sub-B is not in the domain served by server 1030A. Consequently, as indicated by action 10A-3, server 1030A sends a query to master server (NAPS) 1030M in order to determine the service provider who serves subscriber sub-B. Action 10A-4 shows an address to the service provider of domain 102OB being returned to server 1030A, which in turn is forwarded at action 10A-5 to local exchange 1022A. Then, at action 10A-6, the call inclusive of the address of the service provider of domain 1020B is directed by local exchange 1022A to gateway GWA. Action 10A-7 shows the routing or address message being transmitted between gateways GWA and GWB. Upon receipt of the address message, at action 10A-8 gateway GWB queries the subscriber location server (NAPS) 1030B of domain 1030B to determine the node in domain 1020B to which subscriber sub-B is connected. Action 10A-9 shows a network routing prefix (NRP) [indicative of local exchange 1022B] being returned for subscriber sub-B. By action 10A-10 gateway GWB routes the address message to local exchange 1022B, and by action 10A-11 subscriber sub-B is reached. Local exchange 1022B, which serves as the terminating exchange, removes the NRP.

It should be understood that each of the gateways in FIG. 10A are connected to the subscriber location server (NAPS)s of their respective domains in order to process address messages which are incoming to their respective domains. Moreover, it may occur for some calls made outside of a domain, such as frequently made calls, that subscriber location servers need not consult the master server (NAPS) 1030M if the master server 1030M downloads provider information to the domain server. In the example just described, actions 10A-3 and 10A-4 can be conducted internally by server 1030A if server 1030A has already stored an indication of the service provider for subscriber sub-B. Further, in a situation wherein actions 10A-3 and 10A-4 do involve consultation of master server 1030M, it is possible for master server 1030M to include in the routing or address message the node in domain 1020B for subscriber sub-B. That is, master server 1030M may include, in the address message returned at action 10A-4, domain 1020B's NRP for subscriber sub-B if such is known by server 1030M. Inclusion of the receiving domain's prefix would obviate actions 10A-8 and 10A-9 of FIG. 10A.

FIG. 10B resembles FIG. 10A, but domain 1020B' of FIG. 10B provides mobile telecommunications service. To facilitate the mobile communications, domain 1020B' has a Gateway Mobile Switching Center (GMSC) and a Mobile Switching Center with Visiting Location Register (MSC/VLR). GMSC is connected by land lines to gateway GWB (1) and to the MSC/VLR, and to a Home Location Register HLR(1) and Home Location Register HLR(2). The MSC/VLR is also connected to both HLR(1) and HLR(2) by ITU-T signaling system no. 7, and to the GMSC by land lines. In addition, MSC/VLR is connected by land lines to BSC/BSMC (Base Station Controller/Base Station Short Message Server).

FIG. 10B illustrates a call made from fixed subscriber sub-A in domain 1020A towards a mobile GSM subscriber who has been ported from service provider C (serving domain 1020C) to service provider B (serving domain 1020B). Actions 10B-1 through 10B-9 resemble correspondingly numbered actions 10A-1 through 10A-9 discussed above with reference to FIG. 10A. However, when subscriber location server (NAPS) 1030B is queried, server 1030B returns, in action 10B-9, a NRN including a Network Routing Prefix which is indicative of the Gateway Mobile Switching Center (GMSC). The address message is transmitted to the GMSC as indicated by action 10B-10. The GMSC translates the mobile station ISDN number (MSISDN) in the address message to a Global Title used for addressing the HLR(1). Normally MSISDN is put in as the Global Title, but at this juncture a translation is needed for avoiding any updates in intermediate signal transfer points (STPs). This translation can be done internally in the GMSC or a query can be made to a database for the translation from MSISDN to a routing number used for GT addressing forwards to HLR(1). At action 10B-11, the Home Location Register for subscriber sub-B (i.e., HLR(1)) is called by the GMSC. HLR(1) then calls the Mobile Switching Center with Visiting Location Register (MSC/VLR) [action 10B-12], which selects and returns a roaming number to HLR(1) [action 10B-13]. The roaming number is then, as reflected by action 10B-14, passed to the GMSC. The GMSC uses the roaming number in the called party number parameter (CdPN) to address the MSC/VLR where subscriber sub-B resides [action 10B-15]. Action 10B-16 shows subscriber sub-B being paged using the international mobile subscriber number (IMSI).

The roaming number (mentioned above with respect to action 10B-13, for example) can itself utilize the principles of the present invention. In this regard, the roaming number can include a Network Routing Prefix (NRP) suitable for locating to which HLR the subscriber currently belongs. The allocation of MSISDN numbers within GSM has been done in similar way as in a fixed network, e.g., allocation number series per providers. However, when mobile subscribers desire to change network provider and port (e.g., relocate) their number, the MSISDN can no longer be used to locate the correct HLR. Instead, the NAPS must be consulted to get the NRP for the correct HLR. The HLR then communicates with the Visiting Location Register (VLR) which generates a roaming number consisting of a NRP and a temporary VLR number related to the subscriber in question. When the Mobile Switching Center with Visiting Location Register (MSC/VLR) is reached, the NRP is recognized as its own and the rest of the number is analyzed to obtain information from the VLR in which Base Station Controller (BSC) the subscriber currently resides.

FIG. 10B(1) and FIG. 10B(2) show that subscriber sub-B's home location register HLR(1) can be connected to NAPS 1030B in a manner so that subscriber sub-B can use the same directory number for both mobile and fixed locations. Given such connection, as a result of commands initiated from subscriber sub-B's mobile telephone, HLR(1) sends a "Register" message for subscriber sub-B to server (NAPS) 1030B. Upon receipt of such a "Register" message, server 1030B changes in its database the NRP associated with subscriber sub-B's directory number from the local exchange serving subscriber sub-B's fixed telephone to GMSC. Conversely, as illustrated by FIG. 10B(2), a "Deregister" message from HLR(1) to server 1030B prompts server 1030B to change its database so that the NRP associated with subscriber sub-B's directory number returns to the exchange identifier for subscriber sub-B's fixed telephone. The HLR is addressed using TCAP; HLR will likely have a different destination than GMSC since they do not normally reside in the same entity.

FIG. 10C illustrates applicability of number relocateability for cordless terminal mobility (CTM) subscribers using a roaming number approach for handling incoming (terminating) CTM calls. In FIG. 10C, domain 1020B" provides CTM service and is illustrated as having an originating Service Switching Point (SSPo), Service Data Functions service logic (SDFsl) or Service Control Functions service logic (SCFsl), Service Data Functions mobility management (SDFmm) or Service Control Functions mobility management (SCFmm), and a terminating Service Switching Point SSPt.

When a CTM subscriber changes service provider a new international portable user identifier (IPUI) should be received (i.e., an new IPUI which is not portable), but the CTM-number will be kept by the subscriber when porting. When porting a CTM subscriber between service providers, it must be possible for a service provider's network, in a relocateability domain, to route a call to the ported subscriber based on the CTM number.

For reaching the terminating network, the same procedures apply as above discussed for FIG. 10A and FIG. 10B. That is, FIG. 10C has actions 10C-1 through 10C-9 which are analogous to actions 10A-1 through 10A-9 of FIG. 10A, except that action 10C-9 involves returning a NRN with a Network Routing Prefix (NRP) to subscriber sub-B's SSPo. Action 10C-10 shows the routing message with the NRP being forwarded to the SSPo and implicitly also addressing the SCPsl or SCPmm and SDPsl or SDPmm. The SCPmm or SDPmm is addressed if the CTM subscriber is not in the home network and the SCPsl or SDPsl is addressed when the CTM subscriber is within the home network.

The SSPo translates the CTM number included in the routing message to a Global Title (GT) used for addressing the SCOsl. Normally the CTM number is inserted as the Global Title, but now a translation is needed for avoiding any updates in intermediate STPs. This translation can be done internally in the SSPo or a query can be made to a database for obtaining a translation from the CTM number to a number used for GT addressing towards the SCPsl. Alternatively, the NRP delivered by server 1030B could be used for addressing the correct SCPmm (which means that the NRP should not only point out the SSPo but also the SCPmm).

At action 10C-11 the home SCPsl for subscriber sub-B is called. The CTM number is included in the InitialDP sent from SSPo to SCPsl. The InitialDP is the query on ITU-T & ETSI standardized INAP protocol versions 1 & 2, and is the first operation sent from a service switching point to a service control point when an intelligence ("IN") trigger is detected in the service switching point. The SCPsl and the SCFsl/SDFsl maintains an association between the CTM number and the international portable user identifier (IPUI). Action 10C-2 shows subscriber sub-B's SCPsl calling (including IPUI) the SCPmm. At action 10C-13 the SCPmm selects and returns a roaming number to subscriber sub-B's SCPsl. Action 10C-14 involves the SCPsl passing the roaming number to the SSPo. At action 10C-15 the SSPo uses the roaming number in the routing message (CdPN) to address the SSPt where subscriber sub-B resides. At action 10C-16 subscriber sub-B's terminal is paged using the international portable user identifier (IPUI). Action 10C-17 shows a connect operation from SCFmm to the terminating service switching point SSPt; action 10C-18 shows a setup message to the called party's (subscriber sub-B) CTM terminal.

FIG. 10C(1) and FIG. 10C(2) show that subscriber sub-B's SDFsl can be connected to NAPS 1030B in a manner so that subscriber sub-B can use the same directory number for both CTM and fixed locations, in similar manner with FIG. 10B(1) and FIG. 10B(2) described above. In this regard, as illustrated in FIG. 10C(1), when a "Register" message is received by server (NAPS) 1030B from SDFsl, server 1030B associates in its database the NRP for subscriber sub-B's SDFsl with subscriber sub-B's directory number, rather than the local exchange which services subscriber sub-B's fixed telephone. The converse action of "deregistering" is shown in FIG. 10C(2).

Concerning the relocateability of a subscriber's number from a fixed location to a mobile location (e.g., GSM or CTM), the originating local exchange should preferably always query the NAPS since it is the NAPS that knows the current type of access used by the called party. In a situation in which all calls do not automatically invoke a query of the NAPS, the query procedure can be initiated by setting a special category on the called line. This is to trap local calls to this subscriber also in the home local exchange (since local calls might be placed without a query of the NAPS as explained previously).

In both GSM and CTM applications, two addresses are generally required by subscriber number. In GSM, the GMSC and the HLR adddress (NRP) are required. In CTM the SSPo and the SCFsl or SDFsl (home register in CTM) are required.

The fact that a subscriber number will be "local" in an exchange also means that the subscriber number can be defined in several exchanges at the same time. The NAPS can then be used to select which exchange to route the calls through, either randomly or by other criteria, such as time of day called party, time of day calling party, calling party number, called party number, black list of called party, white list of called party, teleservice type (e.g., FAX, speech), Transmission Medium Requirement (TMR), type of station currently in use (GSM, CTM, ordinary), considerations involving the NAPS being in a different time zone than the called party, etc.

Figure 13:
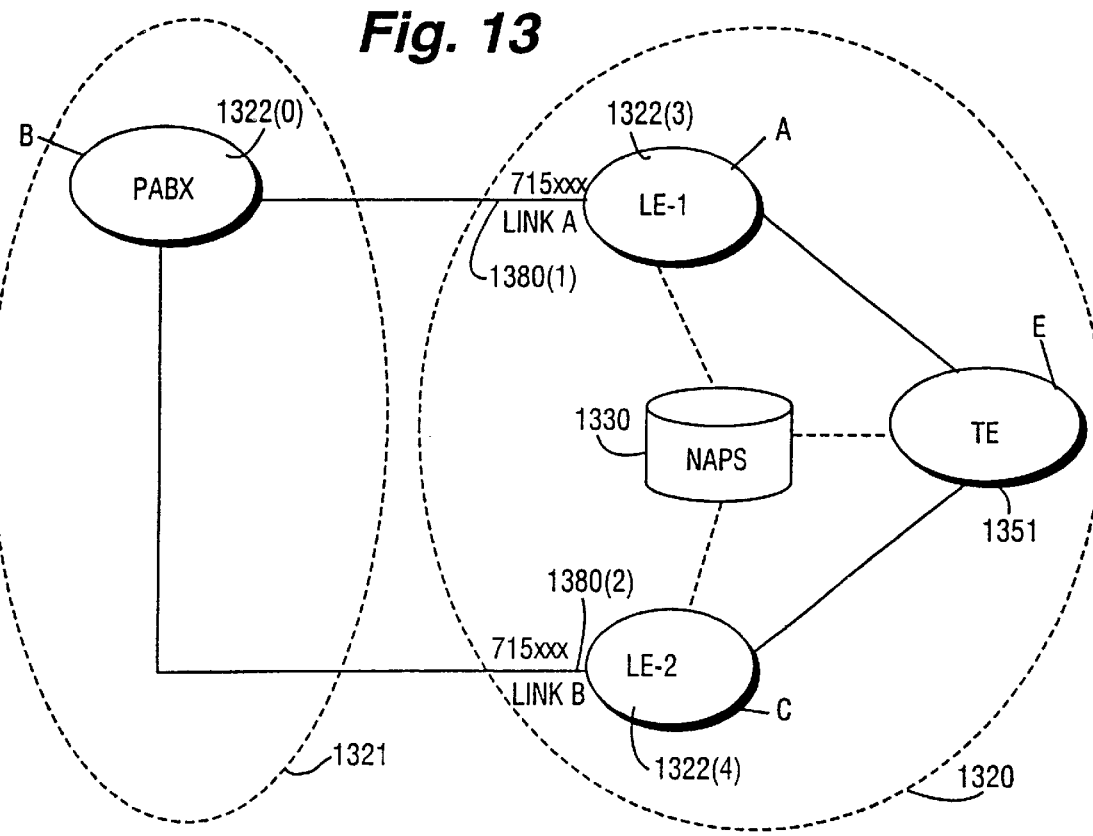
FIG. 13 is a schematic view showing connection of a private network to public network, the public network having a number and address portability server (NAPS) of the present invention and the private network having a PABX.

As shown in FIG. 13, the present invention also permits a private branch exchange (PBX) to be connected to several exchanges and for all lines connected to the PBX to have the same group number. In particular, FIG. 13 shows connection of a private network 1321 to public network 1320. Private network 1321 includes PABX 1322(0). Public network 1320 includes local exchange 1322(3)–1322(4); transit exchange 1351; and NAPS 1330. Transit exchange 1351 is connected to both local exchanges 1322(3) and 1322(4) and to NAPS 1330. Local exchanges 1322(3) and 1322(4) are each connected to NAPS 1330. PABX 1322(0) is connected to local exchange 1322(3) by link 1380(1) and to local exchange 1322(4) by link 1380(2). In FIG. 13, the subscriber location server (NAPS 1330) can be used to distribute calls to lines in different local exchanges.

Figure 13A:
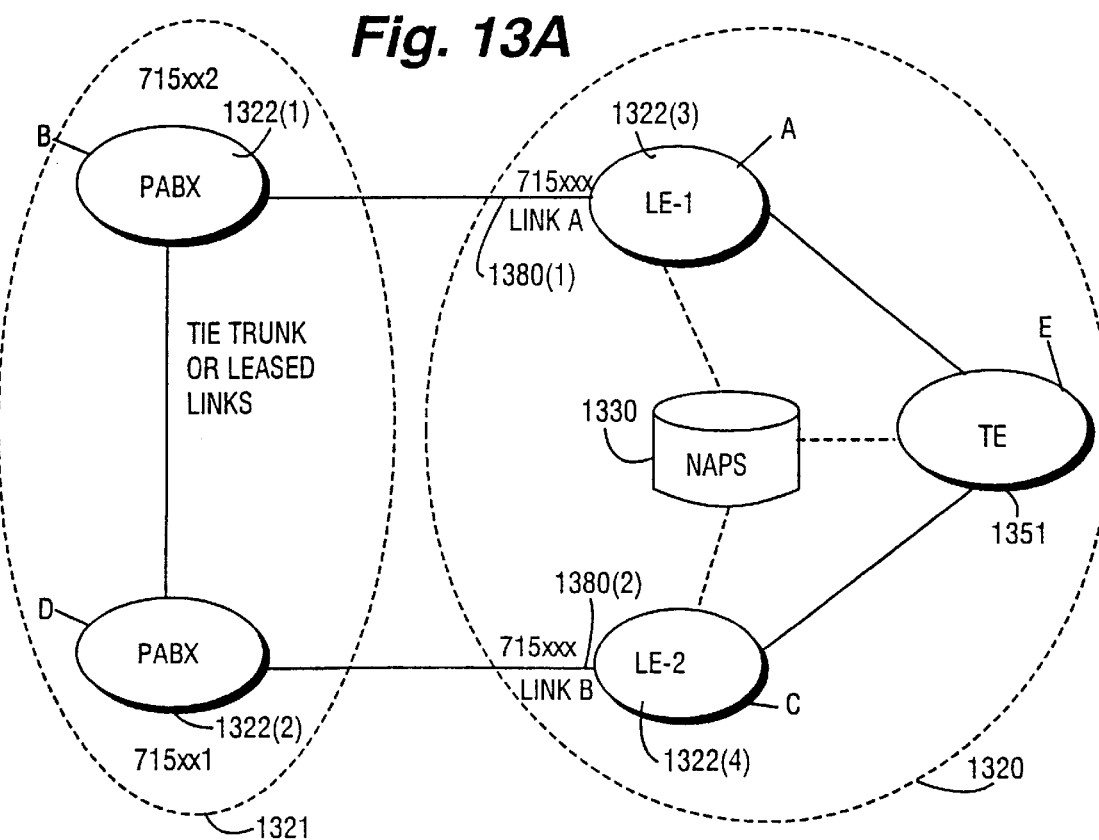
FIG. 13A is a schematic view showing connection of a private network to public network, the public network having a number and address portability server (NAPS) of the present invention and the private network having two PABXs.

The system of FIG. 13A differs from that of FIG. 13 in that private network 1321 includes PABXs 1322(1) and 1322(2), connected by tie trunks TT or leased lines. PABX 1322(1) is connected to local exchange 1322(3) by link 1380(1); PABX 1322(2) is connected to local exchange 1322(4) by link 1380(2).

In FIG. 13A, subscriber sub-A is connected to local exchange 1322(3); subscriber sub-B is connected to PABX 1322(1); subscriber sub-C is connected to local exchange 1322(4); subscriber sub-D is connected to PABX 1322(2); and subscriber sub-E is connected to exchange 1351. Both PABXs 1322(1) and 1322(2) have the same group number (i.e., "715") for all connections. Subscriber sub-B connected to PABX 1322(1) has CdPN or extension "xx2"; Subscriber sub-D connected to PABX 1322(2) has CdPN or extension "xx1".

Thus, FIG. 13A shows how to connect a PBX with the same number to several local exchanges. Moreover, in FIG. 13A, NAPS 1330 selects the shortest public way from a calling subscriber to the called subscriber. As one example, if subscriber sub-A calls subscriber sub-D, the CdPN of sub-D will be recognized by local exchange 1322(3) directly and no query need be sent to NAPS 1330, i.e., link 1380(1) will be utilized. As another example, if subscriber sub-E places a call to a party in the private network, NAPS 1330 is queried to determine whether the call is to be routed via link 1380(1) or 1380(2).

Figure 12:
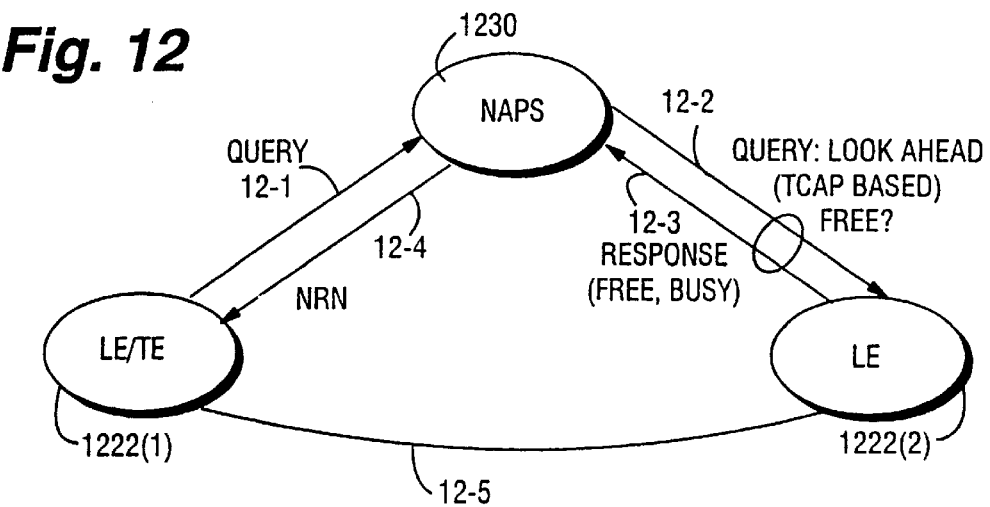
FIG. 12 is a schematic view illustrating how a number and address portability server (NAPS) of the present invention is utilized to perform a "look ahead" function.

FIG. 12 illustrates how NAPS of the present invention can be easily and economically utilized to perform a "look ahead" function. FIG. 12 shows a first exchange 1222(1) [which can be either a local exchange or a transit exchange] connected to a local exchange 1222(2). Both first exchange 1222(1) and local exchange 1222(2) are connected to NAPS 1230. If first exchange 1222(1) receives a called party number (CdPN), first exchange 1222(1) takes action 12-1 to query NAPS 1230 for the Network Routing Number (NRN) of the called party. Assuming that NAPS 1230 determines that the called party is connected to local exchange 1222(2), by action 12-2 NAPS 1230 first performs a "look ahead" query of local exchange 1222(2) [particularly its TCAP board] to determine the status of the called party, e.g., if the called party is free. Local exchange 1222(2) responds at action 12-3 with an indication whether the call has a chance to succeed. If the called party is free, e.g., if the call has a chance to succeed, at action 12-4 NAPS 1230 returns the Network Routing Number (NRN) for the called party to first exchange 1222(1). First exchange 1222(1) then prepares its Initial Address Message (IAM) using the NRP (as shown by action 12-5). On the other hand, if the response at action 12-3 indicates that the call will not succeed, NAPS 1230 can either send an appropriate message to first exchange 1222(1) for forwarding to the calling party or NAPS 1230 can perform a call forwarding operation. Such forwarding is performed on the basis of the called party's profile as stored at NAPS 1230, and involves returning at step 12-4 an NRN for the address to which the call is to be forwarded. In connection with the look ahead features depicted in FIG. 12, whether a call has a chance to succeed can depend on various parameters or circumstances. One such circumstance is whether the called party is busy or not. Another circumstance or parameter is whether the called party subscribes to a service type that is necessary to complete the call. For example, a call may not succeed if ISDN services are requested by a caller but the called party supports only POTS. In this latter example, actions 12-2 and 12-3 are not necessary if NAPS 1230 stores necessary information identifying the characteristics of service to the called subscriber. In such example wherein the NAPS 1230 stores subscriber characteristics, the NAPS serves for screening of calls for compatibility control purposes.

Figure 12A:
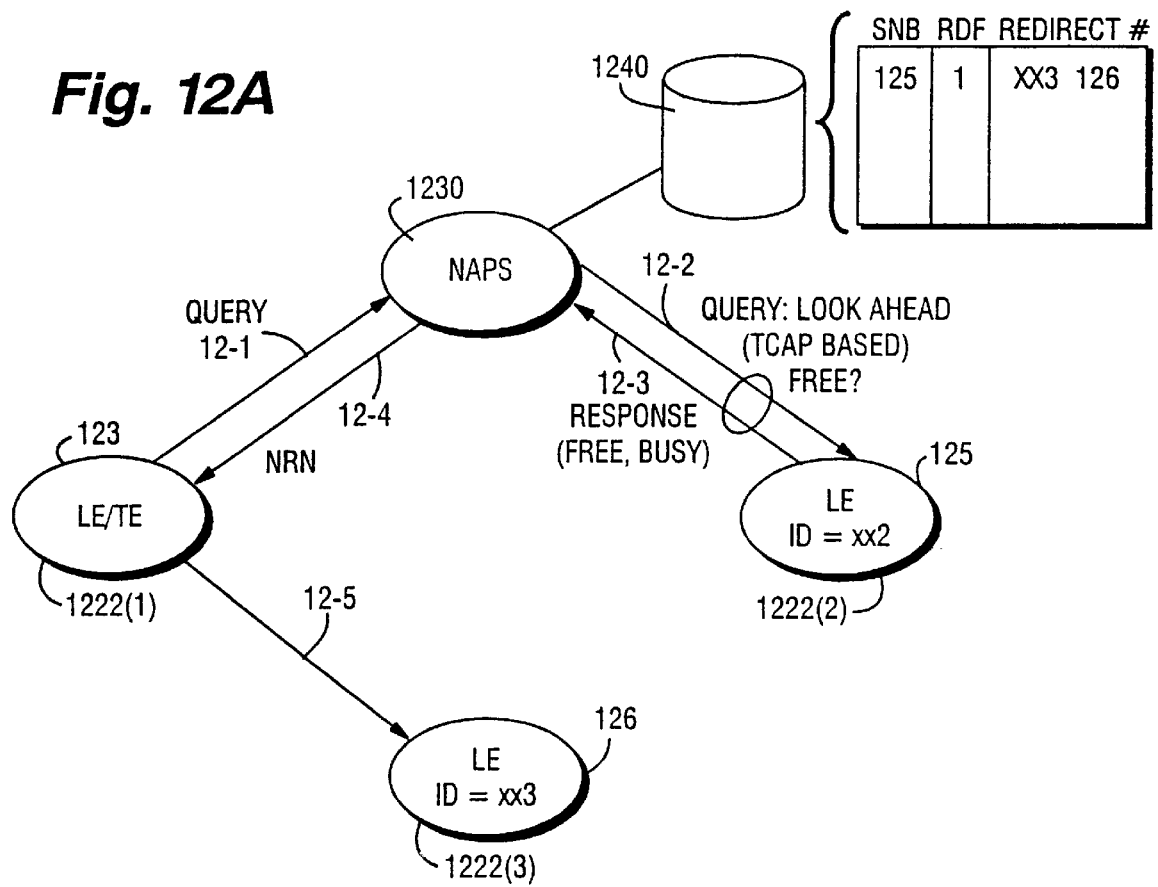
FIG. 12A is a schematic view illustrating how a number and address portability server (NAPS) of the present invention is utilized to perform a "look ahead" function and a call redirect function.

FIG. 12A shows an embodiment which is a variation of the embodiment of FIG. 12. In FIG. 12A, database 1240 of NAPS 1230 includes a special record for subscribers who want calls redirected or rerouted in the event that the look ahead feature determines that a call will not succeed. In this regard, database 1240 includes a redirect flag (RDF) for subscribers who desire for calls to be rerouted under such circumstances. In the example shown in FIG. 12A, when NAPS 1230 determines (e.g., via query and response denoted as actions 12-2 and 12-3) that a call from subscriber 123 to subscriber 125 will not succeed, NAPS determines from database 1240 that the RDF flag for subscriber 125 has been set, and that the number to which the call is to be rerouted (the redirect #) has called party number "126" at exchange 1223(3). In this regard, the redirect # field of the record in database 1240 for subscriber 125 has the contents "xx3126", of which the "xx3" is the NRP for exchange 1222(3) and the "126" is the called party number which is to receive the call in lieu of subscriber 125. Action 12-5 of FIG. 12A thus illustrates the call being redirected or rerouted to local exchange 1222(3) for forwarding to subscriber 126.

In another embodiment, the NAPS of a public operator (e.g., a public service provider) can be connected to a NAPS of a private network. Such connection can be implemented by another type (non-SS No. 7) of underlying protocol open for non-public operators, e.g., the Transmission Control Protocol/Internet Protocol (TCP/IP).

The NAPS of the present invention also facilitates an operation of determining location of closest facilities. For example, if a calling subscriber dials a national telephone number for a franchised company, the NAPS can direct the call to the closest local office of the franchised company. If there is no close local office, the NAPS can either eject the call, generate a new routing message to another office of the company, or direct the call to the closest appropriate PBX entry. Similarly, public short numbers (e.g., "911") can be routed to a closest local police office, for example.

In the foregoing embodiments it should be understood that a query to a subscriber location server can include more parameters than the called party's directory number. The following additional parameters can be included in such a query: the calling party's number (routing may depend on this); the calling party's exchange prefix (to allow routing to a closest PBX entry); required teleservice (to allow differing routing for different types of calls, e.g., fax calls); and required bandwidth (to allow different routing for different types of services, e.g., ISDN).

The number relocateability domains (NPDs) of the present invention, having a centralized subscriber location server, provide numerous advantages. Subscribers can move freely within the domain and retain the same directory number. In this regard, connection of a relocating subscriber to a new line of a new local exchange requires only updating of the database maintained by subscriber location server and updating of the old local exchange and new local exchange for the relocating subscriber.

Moreover, the present invention can pertain to a public network with millions of subscribers. By having a centralized subscriber location server, it is unnecessary to replicate a database in each node of a network. The subscriber location server may also exist in several hierarchial levels, e.g., sub-national level, national level, universal level. For countries having a telecommunications regulatory office or the like, the national subscriber location server can be maintained by such office. A universal level server can be maintained by an organization such as the United Nations or ITU.

The present invention provides an efficient and effective way of temporarily rerouting calls for a subscriber to a different exchange. In fact, the present invention uses existing signalling protocol when sending the Network Routing Number (NRN) forward in the domain by replacing the address signal field (ASF) of a conventional routing message (e.g., the CdPN parameter) with a concatenation of the NRP and the called party's directory number. The present invention thus does not require any advanced signalling protocol like ISUP, and accordingly can work well on a system such as a RS2 (MFC-based) signalling system. The present invention works well with modern signalling protocols and older protocols, since no other protocol parameter other than the called party number (CdPN) is utilized.

The Network Routing Number (NRN) of the invention includes a Network Routing Prefix (NRP) that need be obtained only once upon call placement. The NRP is obtained either at the originating local exchange (if the originating local exchange is in the relocateability domain) or at the first exchange encountered in the relocateability domain. The NRP is removed only at the terminating local exchange. Every local exchange is assigned one unique exchange identifier, which identifier is used by the location subscriber server as the NRP for routing purposes.

Calls within the number relocateability domains of the present invention are handled efficiently and effectively. In one mode of the invention, if the calling and called parties are connected to the same exchange, there is no need to access the subscriber location server. The originating local exchange also determines whether the call will be directed outside of the number relocateability domain. In such case, the call is completed as an ordinary call using the CdPN parameter so that there is no conversion for calls outgoing from the number relocateability domain.

The subscriber location server of the present invention knows where each subscriber is located. Accordingly, the subscriber location server owns all numbers which are possible to port in the domain, and thus is the donor exchange, thereby simplifying administration.

The present invention also offers scalability. It is possible with the present invention to have a call forwarding service in the subscriber location server (e.g., NAPS), for example to be used when forwarding a call within a same charging or tariff zone. In such forwarding, the subscriber location server returns an NRN for the location to which the call is to be forwarded. In a similar manner, it is possible to define the same subscriber number (e.g., PBX) in several local exchanges and then, in the subscriber location server, to make a determination as to which local exchange the call to such subscriber number should be routed. Such determination can be made on any of a number of bases, such as depending on the originating caller's geographies, time of day, calling party number, etc. It is also possible for the subscriber location server to route calls to different networks depending on the type of access being used by the called party at a certain moment, e.g., if a cellular phone is being used or a fixed phone. In so doing, the subscriber location server returns a first prefix for a cellular connection and a second prefix for a fixed connection. This permits the possibility of a subscriber having the same number for both cellular and fixed phones. Changing between cellular and fixed phones can be based by the subscriber location server automatically on such actions as the subscriber switching on/off his cellular phone or by other subscriber procedures (e.g., subscriber sending a directive to the subscriber location server).

The present invention makes it possible to connect a remote subscriber stage (RSS) to more than one local exchange. This provides enhanced security on outgoing calls from subscribers connected to the RSS in question. For example, if a first local exchange to which the RSS is connected either fails or is out of service for maintenance purposes, the RSS can be connected to a second local exchange, thereby affording its subscribers continued service despite the unavailability of the first local exchange.

Advantageously, it is only required of exchanges that the exchanges be able to query the subscriber location server when necessary and handle the returned NRN (including prefix NRP) for routing. Beyond this exchanges need not be upgraded with hardware or software.

The Network Routing Prefix (NRP) returned after query from the subscriber location server can be used in conjunction with subscriber servers such as call completion to busy subscriber (CCBS) and call completion at no reply (CCNR), and also can be used in Global Title Analysis in SCCP.

It has been mentioned above, for example in connection with step 2—2, an exchange may determine whether a called party number is within a series of numbers which has the number relocateability function of the present invention. Each exchange in the domain is provided with the series. It is possible that some of the subscribers connected to a certain local exchange may have the number relocateability feature (i.e., be within the series) while other subscribers connected to the same exchange may not have the number portability feature (i.e., not be within the series). The series may change over time. Such can occur, for example, upon growth of the domain to include numbers formerly outside of the series, thereby requiring enlargement of the series. Moreover, some numbers may never be relocateable, such as numbers for test calls (e.g., for testing trunks to particular destinations).

The present invention works for all types of subscribers, POTS (plain old telephone system), ISDN (integrated services digital network), PABX, and ISPBX connected subscribers. Moreover, the present invention interferes very little, if at all, with existing services in most networks and accordingly is very easy to introduce. For example, the present invention is compatible with services such as the following: (1) direct dialing in (DDI, which is used to make calls to digital PBXs including the extension number); (2) multiple subscriber number (MSN, which is similar to DDI but used on ISDN basic access to set up calls to ISDN terminals); (3) connected line identification presentation (COLP); (4) connected line identification restriction (COLR); (5) calling number validation (used to approve that a received number from an ISDN terminal or PBX is a valid number which can be used by the switch and ISDN services); and (6) connected number validation.

Figure 14:
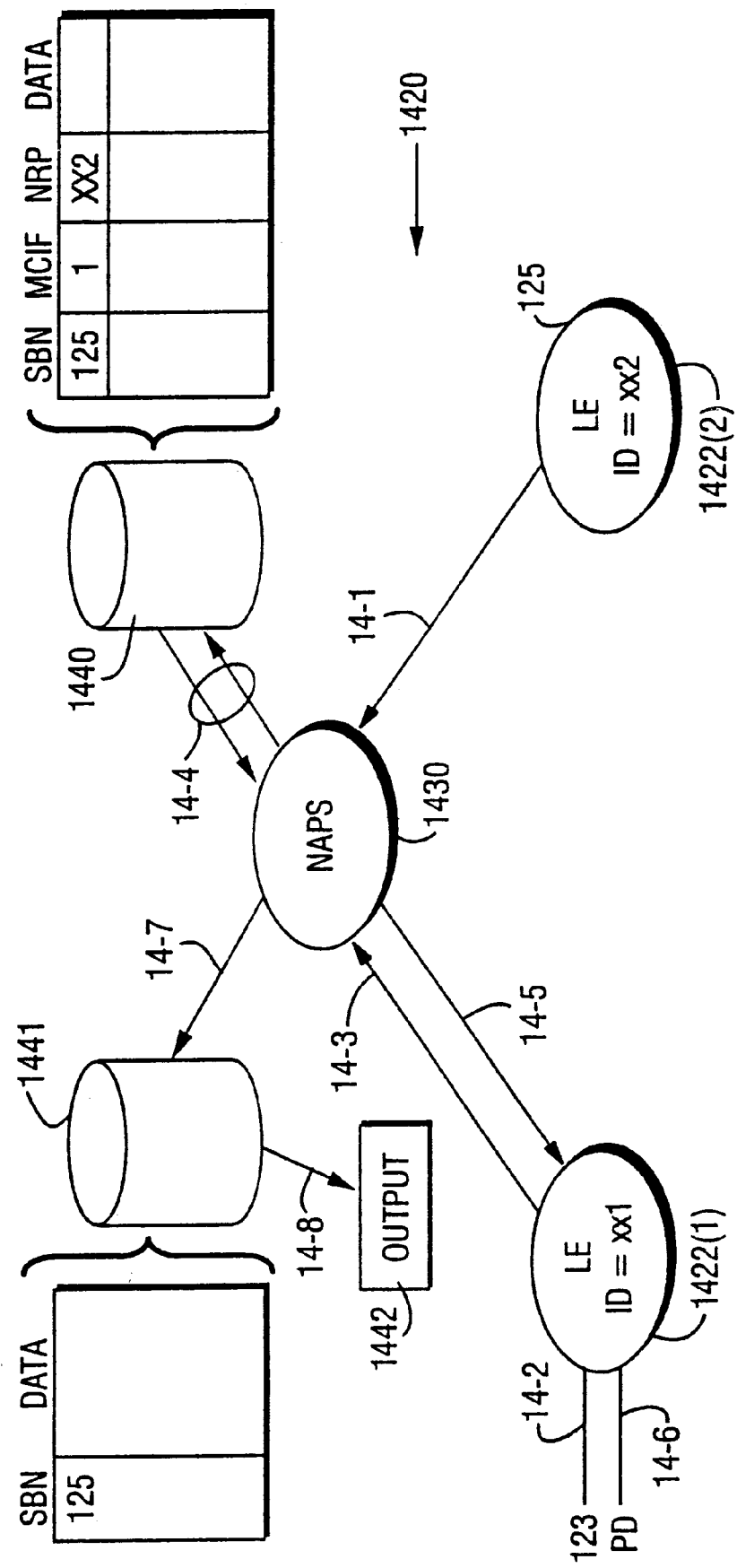
FIG. 14 is a schematic view illustrating how a number and address portability server (NAPS) of the present invention is utilized to perform malicious call identification functions.

FIG. 14 is a schematic view of a domain 1420 in which a NAPS 1430 performs malicious call identification (MCID) services. FIG. 14 resembles FIG. 3 in having a subscriber S123 connected to a first local exchange [local exchange 1422(1)] and a subscriber S125 connected to a second local exchange [local exchange 1422(2)]. Both local exchanges 1422(1) and 1422(2) are serviced by NAPS 1430. NAPS 1430 has two databases, particularly database 1440 and 1441. Database 1440 resembles other databases denominated herein as reference numeral 40, with the exception that each subscriber's record has a field identified as the malicious call identification flag (MCIF). Database 1441 is connected to NAPS 1430 to log malicious call information processed by NAPS 1430. Database 1441 is connected to an output device 1442, such as a printer or display, so that database 1441 can be queried and its contents outputted for analysis and/or reporting.

In action 14-1 of FIG. 14, subscriber 125 requests the malicious call identification service (MCID) of NAPS 1430. In response to the request, the malicious call identification flag (MCIF) is set to "1" as indicated in FIG. 14. When a malicious subscriber S123 places a call to subscriber S125 (as indicated by action 14-2), local exchange 1422(1) inquires of NAPS 1430 the NRP for subscriber S125 (action 14-3). However, noting at action 14-4 that the malicious call identification flag (MCIF) has been set to "1" in database 1440, NAPS 1430 does not return the NRP=xx2 for local exchange 1422(2), but instead returns at step 14-5 a predetermined NRP for a local police station (e.g., subscriber PD connected to local exchange 1422(1) in FIG. 14). As indicated by action 14-6, the call is routed by local exchange 1422(1) to the police station (subscriber PD). Action 14-7 shows NAPS 1430 logging selected data related to the malicious call to database 1441. Action 14-8 reflects generation of output, e.g., by operator request for automatically, concerning malicious call information collected in database 1441.

Thus, malicious calls in the system of FIG. 14 are rerouted to an alternate location such as a police station so that the called subscriber need not be victimized. This call routing to the police station gives the police an opportunity to trace the malicious subscriber even before the call rings either at the ordinary called party number or at the police station.

Modifications of the system of FIG. 14 include storing in database 1440 certain calling telephone numbers for which the called subscriber desires the MCID service to be selectively invoked, so that only calls from known offenders are rerouted. The information stored in database 1441 includes, for example, for each call the calling time, the calling party number and exchange ID, the called party number, the called party exchange ID. In FIG. 14 it just so happens that the police station PD is located at the same local exchange 1422(1) as the malicious caller, although such need not be the case. Moreover, it should be noted that, where appropriate, databases 1440 and 1441 can be stored on the same storage medium rather than on two distinct media as shown in FIG. 14. Further, at action 14-6 the NAPS 1430 can route the call to the closest police station to the calling party exchange by selecting from a plurality of police stations in its database. Yet further, the NAPS 1430 can cause a short delay (e.g., 10 seconds) to be interposed between the routing of the call to the police station and any further routing of the call (e.g., if the call is to then be routed to the called subscriber).

The present invention thus provides a tracing of the exchange or node from which a call originated. The exchange (node) ID or NRP is available together with MCID (malicious call identification) service. The following alternatives are provided in this regard: (1) a manual request against the subscriber location server is performed by the person or application using the function; (2) the exchange ID is either sent as a location number or a "generic number" on ISUP; (3) in an originating exchange, the exchange identity is added as a prefix in front of the A-number, in the terminating exchange, the prefix will be removed again, before being presented to the called party. In a case of interworking with non-NRN domains (which are unable to remove the NRP), the NRP is removed by the last exchange within the relocateability domain, e.g., a transit exchange, so that the calling party prefix is not presented to the called party. If location number is used as in the second alternative, the Network Routing Prefix (NRP) of the calling party can be utilized (i.e., NRP+directory number of the calling party).

The present invention is beneficial to the subscriber, since the subscriber need not advise the public of a new directory number when the subscriber relocates. Moreover, the invention also affords an additional measure of privacy to subscribers, since it will not longer be possible to determine in which geographical part of a town a certain subscriber resides merely by analyzing the subscriber's directory number.

When a subscriber ends his/her subscription and is no longer to use a directory number, that directory number should normally be returned (by the latest service provider) to a highest hierarchical level of SLS or NAPS (or a maintenance system) and indicated as being free for reassignment to another subscriber.

While the invention has been particularly shown and described with reference to the preferred embodiments thereof, it will be understood by those skilled in the art that various alterations in form and detail may be made therein without departing from the spirit and scope of the invention.

The invention applies not only to relocateability of telephone numbers for subscribers, but also includes relocateability of telephone numbers for telecommunications systems resources, such as software, for example. In this regard, when addressing software, a telecommunications resource number identifier can be inserted in the address signal field (ASF) of the routing or address message in lieu of a directory telephone number. In such case, the ASF contains the node identifier or network routing prefix (NRP) of the present invention in addition to the resource number identifier.

The embodiments of the invention in which an exclusive property or privilege is claimed are defined as follows:

1. A telecommunications system having subscriber number relocateablity, the system comprising:
   a plurality of exchanges between which calls are connected; and
   a subscriber location server accessed by the plurality of exchanges, for each of a plurality of subscribers the subscriber location server having a changeable mapping of a subscriber number and a network routing prefix;
   the plurality of exchanges being connected to subscribers and to the subscriber location server whereby, as a calling subscriber initiates a call, a called subscriber number is forwarded to the subscriber location server, whereupon the subscriber location server determines the network routing prefix for the called subscriber number and transmits the network routing prefix to an exchange connected to the calling subscriber, and whereby a concatenation of the network routing prefix and the called subscriber number replaces an address signal field of a called party parameter such that the call can be routed.

2. The system of claim 1, wherein a change of connection of the called subscriber from a first exchange to a second exchange involves a remapping in the subscriber location server of the called subscriber number from a network routing prefix of the first exchange to a network routing prefix of the second exchange.

3. The system of claim 1, wherein the exchange which routes the call includes the concatenation of the network routing pefix and the called subscriber number in an industry standard routing message.

4. The systcn of claim 3, wherein the exchange which routes the call includes the concatenation of the network routing prefix and the called subscriber number in the address signal field of the called party number parameter.

5. The system of claim 4, wherein the network routing prefix comprises an exchange identifier of an exchange to which the called subscriber is connected.

6. The system of claim 4, wherein the exchange which routes the call includes a telephone resource number identifier in the address signal field of the called party number pararmeter.

7. The system of claim 3, wherein the exchange which routes the call sets a number relocateability flag in the industry standard routing message.

8. The system of claim 3, wherein the exchange which routes the call sets a number relocateability flag in a Nature of Address Indicator (NAI) field of the called party number parameter.

9. The system of claim 1, wherein the system comprises a redundant subscriber location server to which each exchange in the plurality of exchanges is also connected, the redundant subscriber location server also having for each of the plural subscribers the mapping of subscriber number and network routing prefix, and wherein the system further comprises a controller for coordinating the mapping of the subscriber number and the network routing prefix in the subscriber location server and the redundant subscriber location server.

10. The system of claim 1, wherein the subscriber location server comprises a data base in which each relocatable subscriber number in the system is associated with a paired network routing prefix in the system.

11. The system of claim 1, wherein the subscriber location server includes at least two network routing prefixes for the called subscriber number, and wherein the subscriber location server uses selection criteria to select between the two network routing prefixes for transmission.

12. The system of claim 11, wherein the selection criteria is predetermined criteria stored at the subscriber location server.

13. The system of claim 12, wherein the selection criteria is dependent upon time of call placement.

14. The system of claim 12, wherein the selection criteria is inputted by a subscriber and stored at the subscriber location server.

15. The system of claim 11, wherein a first of the network routing prefixes is for a fixed subscriber location and a second of the network routing prefixes is for a mobile subscriber location.

16. The system of claim 11, wherein one of the at least two network routing prefixes is for a cordless terminal mobile (CTM) subscriber.

17. The system of claim 1, wherein a local exchange connected to the calling subscriber forwards the called subscriber number to the subscriber location server.

18. The system of claim 1, wherein a gateway exchange connected to receive a call from a non-relocateability system forwards a called subscriber number to the subscriber location server.

19. The system of claim 1, wherein the called subscriber number is a telecommunications resource number identifier.

20. The system of claim 1, wherein the subscriber location server determines a status of the called subscriber number prior to transmitting the concatenation of the network routing prefix and the called subscriber number.

21. The system of claim 1, wherein the plurality of exchanges defines a domain, the domain being subdivided into subdomains, and wherein the domain further comprises a plurality of subscriber location servers, there being a subscriber location server for each subdomain, and wherein, in accordance with a determination regarding to which of the plurality of subdomains a called subscriber number belongs, a selected one of the plurality of subscriber location servers is accessed in order to obtain the exchange identifier for the called subscriber number.

22. The system of claim 21 wherein the at least one of the of the plurality of subscriber location servers has stored therein both (1) a primary subseries list for the subdomain ordinarily served by the at least one of the of the plurality of subscriber location servers, and (2) a backup subseries list for another subdomain; and further comprising:
   a master controller which selectively enables usage of the at least one of the of the plurality of subscriber location servers for obtaining exchange identifiers for the another domain.

23. The system of claim 1, wherein for at least one subscriber number the subscriber location server has two alternate exchange identifiers, and wherein the subscriber location server selects between the two alternate exchange identifiers.

24. The system of claim 23, wherein a first of the two alternate exchange identifiers is for an exchange of a mobile network and a second of the two alternate exchange identifiers is for an exchange of a fixed network.

25. The system of claim 23, wherein a first of the two alternate exchange identifiers is for an exchange of a mobile network, wherein the subscriber location server selects between the two alternate exchange identifiers in accordance with a predefined input to the subscriber location server, and wherein the predefined input is one of activation and deactivation of a mobile phone.

26. The system of claim 23, wherein a first of the two alternate exchange identifiers is for an exchange of a mobile network, wherein the subscriber location server selects between the two alternate exchange identifiers in accordance with a predefined input to the subscriber location server, and wherein the predefined input is a command sent via the telecommunications system to the subscriber location server.

27. The system of claim 23, wherein the subscriber location server selects between the two alternate exchange identifiers in accordance with a predefined input to the subscriber location server, wherein the predefined input results in the setting of a malicious call identification flag, wherein one of the two alternate exchange identifiers is the exchange identifier of an exchange serving an alternate location, and wherein when the malicious call identification flag is set the call is routed to the alternate location.

28. The system of claim 27, wherein the alternate location is a police station.

29. The system of claim 23, wherein the subscriber location server selects between the two alternate exchange identifiers serving two respective alternate facilities in accordance with geographical relation of the calling subscriber to the alternate facilities.

30. The system of claim 29, wherein the subscriber location server selects the exchange identifier of the closest of the alternate facilities.

31. The system of claim 23, wherein other than exchange identifier the subscriber number is the same regardless to which of two exchanges corresponding to the two alternate exchange identifiers the call is routed.

32. The system of claim 1, wherein at least two of the plurality of exchanges are connected to a private branch exchange (PBX) of a private network.

33. The system of claim 1, wherein at least two of the plurality of exchanges are connected to two respective private branch exchanges (PBXS) of a private network, the two private branch exchanges (PBXs) being tied together by a link and having a same exchange identifier.

34. The system of claim 33, wherein the subscriber location server routes the call to a closest one, with respect to the calling subscriber, of the at least two of the plurality of exchanges connected to the two respective PBXs of a private network.

35. The system of claim 1, wherein the subscriber location server is accessed by a predefined protocol, the predefined protocol including one of the Intelligent Network Part (INAP) protocol and the Transmission Control Protocol/Internet Protocol (TCP/IP).

36. The system of claim 1, further comprising:
a remote subscriber stage through which at least some of the subscribers are connected to a first local exchange and a second local exchange; and
wherein the subscriber location server selects between an exchange identifier for the first local exchange and an exchange identifier for the second local exchange, whereby a call to a subscriber served by the remote subscriber stage can be routed via either the first local exchange of the second local exchange.

37. A method of operating a telecommunications system, the method comprising:
defining, at a subscriber location server, a changeable mapping of a subscriber number and a network routing prefix for each of plural subscribers in the system;
in connection with initiation of a call by a calling subscriber, forwarding a called subscriber number to the subscriber location server;
determining at the subscriber location server the network routing prefix for the called subscriber number; and
using a concatenation of the network routing prefix and the called subscriber number to replace an address signal field of a called party parameter such that the call can be rotated through the telecommunications system.

38. The method of claim 37, further comprising remapping, in the subscriber location server, of the called subscriber number from a network routing prefix of a first exchange to a network routing prefix of a second exchange when a called subscriber changes from the first exchange to the second exchange.

39. The method of claim 37, wherein routing the call involves including the concatenation of the network routing prefix and the called subscriber number in an industry standard routing message.

40. The method of claim 39, wherein the concatenation of the network routing prefix and the called subscriber number is included in the address signal field of the called party number parameter.

41. The method of claim 40, wherein the network routing prefix includes an exchange identifier of an exchange to which the called subscriber is connected.

42. The method of claim 40, routing the call involves including a telephone resource number identifier in the address signal field of the called party number parameter.

43. The method of claim 39, wherein routing the call includes setting a number relocateability flag in the industry standard routing message.

44. The method of claim 43, wherein routing the call includes setting the number relocateability flag in a Nature of Address Indicator (NAI) field of the called party number parameter.

45. The method of claim 37, further comprising:
providing also having, for each of the plural subscribers, the mapping of subscriber number and network routine prefix;
coordinating the mapping of the subscriber number and network routine prefix in the subscriber location server and the redundant subscriber location server.

46. The method of claim 37, comprising storing, in a data base of the subscriber location server, each relocatable subscriber number and a paired network routing prefix therefore.

47. The method of claim 37, further comprising:
assigning in the subscriber location server at least two network routing prefixes for the called subscriber number; and
using selection criteria at the subscriber location server to select between the two network routing prefixes.

48. The method of claim 47, wherein the selection criteria is predetermined criteria stored at the subscriber location server.

49. The method of claim 48, wherein the selection criteria is dependent upon time of call placement.

50. The method of claim 47, wherein the selection criteria is inputted by a subscriber and stored at the subscriber location server.

51. The method of claim 47, wherein a first of the network routing prefixes is for a fixed subscriber location and a second of the network routing prefixes is for a mobile subscriber location.

52. The method of claim 47, wherein one of the at least two network routing prefixes is for a cord less terminal mobile (CTM) subscriber.

53. The method of claim 47, further comprising using a local exchange connected to the calling subscriber to forward the called subscriber number to the subscriber location server.

54. The method of claim 37, further comprising using a gateway exchange connected to receive a call from a non-relocateability domain to forward a called subscriber number to the subscriber location server.

55. The method of claim 37, wherein the called subscriber number is a telecommunications resource number identifier.

56. The method of claim 37, further comprising using the subscriber location server to determine a status of the called subscriber number prior to transmitting a network routing prefix for the called subscriber number.

57. The method of claim 37, further comprising transmitting the network routine prefix to the local exchange connected to the calling subscriber.

58. The method of claim 37, wherein the calling subscriber is connected to an originating exchange and the call is routed to a destination exchange, and wherein the method further comprises:
   detecting a predefined condition at the destination exchange, and upon the detecting returning a predefined condition signal to the originating exchange;
   sending, upon input from the calling subscriber, a call completion request to the destination exchange, the call completion request including the called exchange identifier.

59. The method of claim 58, wherein the predefined condition is one of a busy subscriber and a no response, and wherein the call completion request is one of a call completion to busy subscriber request and a call completion at no response request.

60. The method of claim 37, wherein the domain is subdivided into subdomains, and wherein the domain
   comprises a plurality of subscriber location servers, there being a subscriber location server for each subdomain, and wherein the method comprises:
      determining to which of the plurality of subdomains a called subscriber number belongs;
      in accordance with the determination, accessing a selected one of the plurality of subscriber location servers in order to obtain the exchange identifier for the called subscriber number.

61. The method of claim 60, further comprising:
   storing, at least one of the of the plurality of subscriber location servers, both (1) a primary subseries list for the subdomain ordinary served by the at least one of the of the plurality of subscriber location servers, and (2) a backup subseries list for another subdomain;
   selectively enabling usage of the at least one of the of the plurality of subscriber location servers for obtaining exchange identifiers for the another domain.

62. The method of claim 37, wherein the step of determining a called exchange identifier comprises selecting between two alternate exchange identifiers associated with the subscriber number.

63. The method of claim 62, wherein the selecting is performed in accordance with a predefined input to the subscriber location server.

64. The method of claim 62, wherein a first of the two alternate exchange identifiers is for an exchange of a mobile network, and wherein the predefined input is one of activation and deactivation of a mobile phone.

65. The method of claim 62, wherein a first of the two alternate exchange identifiers is for an exchange of a mobile network, and wherein the predefined input is a command sent via the telecommunications system to the subscriber location server.

66. The method of claim 62, wherein the predefined input results in the setting of a malicious call identification flag, wherein one of the two alternate exchange identifiers is the exchange identifier of an exchange serving an alternate location, and wherein when the malicious call identification flag is set the call is routed to the alternate location.

67. The method of claim 66, wherein the alternate location is a police station.

68. The method of claim 62, wherein the subscriber location server selects between the two alternate exchange identifiers serving two respective alternate facilities in accordance with geographical relation of the calling subscriber to the alternate facilities.

69. The method of claim 68, wherein the subscriber location server selects the exchange identifier of the closest of the alternate facilities.

70. The method of claim 62, wherein other than exchange identifier the subscriber number is the same regardless to which of the two exchanges the call is routed.

71. The method of claim 37, further comprising:
   connecting at least two of the plurality of exchanges to a private branch exchange (PBX) of a private network.

72. The method of claim 37, further comprising:
   connecting at least two of the plurality of exchanges to two respective private branch exchanges (PBXs) of a private network, the two private branch exchanges (PBXs) being tied together by a link and having a same exchange identifier.

73. The method of claim 72, wherein the subscriber location server routes the call to a closest one, with respect to the calling subscriber, of the at least two of the plurality of exchanges connected to the two respective PBXs of a private network.

74. The method of claim 37, wherein the subscriber location server is accessed by a predefined protocol, the predefined protocol including one of the Intelligent Network Application Part (INAP) protocol and the Transmission Control Protocol/Internet Protocol (TCP/IP).

75. The method of claim 37, further comprising:
   connecting a remote subscriber stage, to which at least some of the subscribers are connected, to a first local exchange and a second local exchange; and
   selecting, at the subscriber location server, between an exchange identifier for the first local exchange and an exchange identifier for the second local exchange, whereby a call to a subscriber served by the remote subscriber stage can be routed via either the first local exchange of the second local exchange.

76. The method of claim 37, further comprising:
   using one of a local exchange, a transit exchange, and a gateway exchange to forward the subscriber number to the subscriber location server.

* * * * *